(12) United States Patent
Barthe et al.

(10) Patent No.: US 8,632,734 B2
(45) Date of Patent: Jan. 21, 2014

(54) HIGH THROUGHPUT THERMALLY TEMPERED MICROREACTOR DEVICES AND METHODS

(75) Inventors: Philippe J Barthe, Ville Saint Jacques (FR); Nikolaus Bieler, Brig-Glis (CH); Celine Claude Guermeur, Chartrettes (FR); Olivier Lobet, Mennecy (FR); Maxime Moreno, Villecerf (FR); Dominique Roberge, Sierre (CH); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 1458 days.

(21) Appl. No.: 11/800,765

(22) Filed: May 7, 2007

(65) Prior Publication Data
US 2007/0264170 A1    Nov. 15, 2007

(30) Foreign Application Priority Data

May 11, 2006    (EP) .................................... 06300455

(51) Int. Cl.
| | |
|---|---|
| *G01N 15/06* | (2006.01) |
| *G01N 21/00* | (2006.01) |
| *B01L 3/00* | (2006.01) |
| *B01L 99/00* | (2010.01) |
| *G01N 1/10* | (2006.01) |

(52) U.S. Cl.
USPC .............. 422/503; 422/68.1; 422/81; 422/82; 422/500; 422/501; 422/502; 422/504; 436/180

(58) Field of Classification Search
USPC .............. 422/68.1, 81, 82, 100–102; 436/180
See application file for complete search history.

(56) References Cited

U.S. PATENT DOCUMENTS

| 5,534,328 | A | 7/1996 | Ashmead et al. .............. 428/166 |
| 6,537,506 | B1 * | 3/2003 | Schwalbe et al. .............. 422/130 |
| 2004/0220434 | A1 | 11/2004 | Brophy et al. ................. 568/959 |
| 2005/0245628 | A1 | 11/2005 | Hubel et al. ................... 521/137 |
| 2005/0267270 | A1 | 12/2005 | Fitzgerald et al. .............. 526/88 |
| 2006/0016216 | A1 * | 1/2006 | Tonkovich et al. ............. 62/617 |

FOREIGN PATENT DOCUMENTS

| EP | 1160241 A2 | 6/2001 |
| EP | 1358931 A2 | 4/2003 |
| WO | WO98/02237 | 1/1998 |
| WO | WO98/33585 | 8/1998 |

(Continued)

OTHER PUBLICATIONS

Polymerization Initiators Center—Organic Peroxies—Tubular—Multizones—Tubular—Multizones—Polymerization Initiators Center—www.specialchem4polymers.com Jun. 2, 2006.

(Continued)

*Primary Examiner* — Dean Kwak
(74) *Attorney, Agent, or Firm* — Gregory V. Bean

(57) ABSTRACT

A microreaction device or system (4) includes at least one thermal control fluidic passage (C,E) and a principal working fluidic passage (A) with average cross-sectional area in the range of 0.25 to 100 mm², and having a primary entrance (92) and multiple secondary entrances (94) with the spacing between secondary entrances (94) having a length along the passage (A) of at least two times the root of the average cross-sectional area of the passage (A). The device or system (4) also includes at least one secondary working fluidic passage (B) having an entrance (102) and multiple exits (106) including a final exit (106), each exit (106) being in fluid communication with a corresponding one of the multiple secondary entrances (94) of the principal fluidic passage (A).

36 Claims, 15 Drawing Sheets

(56) References Cited

FOREIGN PATENT DOCUMENTS

| WO | WO99/22857 | 5/1999 |
| WO | WO02/09867 A1 | 2/2002 |
| WO | WO02/40158 A2 | 5/2002 |
| WO | WO02/085329 | 10/2002 |
| WO | WO03/106386 | 12/2003 |
| WO | WO2004/034943 A3 | 4/2004 |
| WO | WO2004/103549 A2 | 12/2004 |
| WO | WO2005/060658 | 7/2005 |
| WO | WO2005/105665 A2 | 11/2005 |

OTHER PUBLICATIONS

Polymerization Initiators Center—Organic Peroxies—Tubular—Cocktails—Tubular—Cocktails www.specialchem4polymers.com Jun. 2, 2006.

Polymerization Initiators Center—Organic Peroxides—Tubular Process—Tubular Process www.specialchem4polymers.com Jun. 2, 2006.

Kontinuierlich arbeitende Fadenreaktoren fur mikropraparative Zwecke, Von Dr. L. meszaros, et al Fette—Seifen—Anstrichmittel 1968.

* cited by examiner

HIGH THROUGHPUT THERMALLY TEMPERED MICROREACTOR DEVICES AND METHODS

PRIORITY

This application claims priority to European Patent Application number 063004550.3, filed May 11, 2006, titled "High Throughput Thermally Tempered Microreactor Devices and Methods".

BACKGROUND OF THE INVENTION

1. Field of the Invention

The present invention relates generally to microreactor and microfluidic devices and systems, typically devices with at least one characteristic dimension of around a few millimeters or less, and particularly to high throughput, thermally tempered microreactor devices and microfluidic devices.

2. Technical Background

One current focus for microreaction technology is on utilizing the high surface-to-volume ratios possible in small channels—one or more orders of magnitude greater than typical batch reactors—to provide advantages both in chemical lab work and in chemical processing and production.

Devices with very high surface to volume ratios have the capability to provide high heat and mass transfer rates within small volumes. Well-recognized potential advantages include (1) higher productivity and efficiency through higher yield and purity, (2) improved safety through dramatically reduced process volumes, (3) access to new processes, new reactions, or new reaction regimes not otherwise accessible, which may in turn provide even greater yield, purity, or other benefits.

Challenges exist, however, in providing microreaction devices and processes to achieve high-throughput, high-yield, well-controlled performance of fast exothermic or fast endothermic reactions, particularly those that are especially temperature-sensitive. Fast exothermic or fast endothermic reactions can quickly produce or absorb sufficient heat to significantly alter reactant temperatures. If the desired reaction is also particularly temperature-sensitive, the heat generated or absorbed by the reaction typically results in poor or even zero yield, due to poor reaction control allowing undesired or uncontrolled reactions.

Challenges also exist in maintaining local molar ratios at or below desired levels in microreaction environments. Since many reactions are highly sensitive to any excess of one reactant, local buildup of that one reactant to levels above the desirable molar ratio for the reaction can cause unwanted side reactions or follow-on reactions and resulting loss of yield.

Microreaction devices intended for temperature-sensitive fast endothermic or fast exothermic reactions are typically provided with smaller-dimensioned channels, even relative to other microreaction devices, such as on the order of 100 μm or even less, so as to achieve very high surface to volume ratios within the channels. The higher surface to volume ratios provide faster heat transport, allowing generally for improved reaction control and yield relative to larger-dimensioned devices. But decreasing the channel dimensions generally also decreases throughput, particularly if pressure drop is to be kept at reasonable levels.

As a means of compensating for or offsetting this tendency toward decreased throughput in microreaction devices, "external numbering up" or "internal numbering up" or both are employed. External numbering up involves placing multiple separate microreaction devices in parallel, with external fluid distribution equipment to deliver fluids to the devices. Internal numbering up involves including, within a given microreaction device, multiple mixing and/or reaction chambers in parallel. In either case, however, flow balancing becomes critical, and small flow deviations can result in poor reaction control by producing locally imbalanced molar ratios.

Numbering up can also be expensive. External numbering up requires external regulation control systems, which can be a significant expense. In the case of internal numbering up, and in the case of passive external flow splitting, even after careful design of the fluid channels and stringent manufacturing control, sufficiently good flow balance is difficult to achieve in typical devices. Slight chemical or mechanical erosion over the life of the device will alter flow balances and resulting molar ratios, further reducing performance. Thus device lifetime can be shortened, and expenses increased, relative to a device without numbering up, or relative to a device that can achieve higher throughput without numbering up. Further, passive flow dividers designed to produce good flow balances for one reaction or reactant system may not perform well with another reaction or reactant. Internal numbering up can thus narrow the range of application of a given device, requiring an increased number of device types or designs to address a given range of reaction parameters, with associated increased expense.

A microreaction device and method particularly well-suited for economically and reliably achieving higher-throughput, high-yield, well-controlled performance of fast exothermic or fast endothermic reactions, and/or for providing a high degree of local molar ratio control is thus desirable.

SUMMARY OF THE INVENTION

According to one aspect of the present invention, a microreaction device has at least one fluid passage for a thermal control or thermal buffer fluid, and has a principal working fluidic passage with a primary entrance and multiple secondary entrances. The cross-sectional area of the principal fluidic passage is generally in the range of 0.25 to 100 mm$^2$, desirably within the range of 0.3 to 20 mm$^2$, and more desirably within the range of 0.5 to 6 mm$^2$. The spacing length along the principal fluidic passage between secondary entrances is preferably at least two times the root of the average cross-sectional area of the passage, such that fluid flowing in the principal fluidic passage has a non-negligible time and space in which to mix or begin mixing and/or to react or begin reacting, with any fluid entering at a given secondary entrance, before reaching the next secondary entrance.

The device also includes at least one secondary working fluidic passage, desirably having an average cross-sectional area within the range of 0.25 to 100 mm$^2$, desirably within the range of 0.3 to 20 mm$^2$, and more desirably within the range of 0.5 to 6 mm$^2$. The secondary fluidic passage has an entrance and multiple exits including a final exit. Each exit is in fluid communication with a corresponding one of the multiple secondary entrances of the principal fluidic passage, with the exits and secondary entrances paired in order from those nearest to the entrances of the two passages to those furthest from the entrances. Hence a fluid continuously flowed into the secondary fluidic passage is effectively gradually dosed into a fluid continuously flowed into the principal fluidic passage.

It is desirable that the principal fluidic passage include, in order between each secondary entrance, a mixing section and a dwell-time section. The mixing section desirably comprises a narrower, more tortuous section of the principal fluidic passage. The dwell-time section desirably comprises a broader, less tortuous section of the principal fluidic passage. The narrower, more tortuous section provides desired mixing effects, at the cost of some pressure drop, while the broader, less tortuous section provides desired dwell time, with very minimal pressure drop, during which time reaction, heat exchange, or other processes can take place or continue to take place. The narrower, more tortuous section is desirably comprised of curves or bends in the fluidic passage, with the curves or bends lying in more than one plane. This three-dimensionally tortuous type of tortuous passage provides for improved mixing through more efficient generation of the types of secondary flows that assist mixing, relative to tortuous passages with bends or curves all in one plane. Each narrower, more tortuous section and each broader, less tortuous section share at least one and desirably at least two common walls with a thermal control fluidic passage, such that thermal control or heat exchange is provided at each narrower, more tortuous section and at each broader, less tortuous section.

The spacing of the exits in the direction along the secondary fluidic passage desirably has a length of at least eight times the root of the average cross-sectional area of the secondary fluidic passage. Such relatively high ratios of length-dimension to cross-sectional dimensions allows for a desired amount of pressure drop to be reliably provided within the secondary fluidic passage. The distance along the secondary passage between exits from the secondary passage desirably increases from one exit to the next in the direction away from the entrance. This allows an appropriate additional pressure drop to be generated within the secondary fluidic passage, despite decreasing flows as fluid leaves through the successive multiple exits. Alternatively or in addition, the cross-sectional area of the secondary fluidic passage may generally decrease in the direction away from the entrance so as to provide appropriate pressure drop.

As a further additional or alternative means of providing appropriate pressure drop or pressure matching between the principal and secondary fluidic passages, the successive more tortuous sections of the principal fluidic passage may increase in average cross-sectional area in the direction away from the entrance of the principal fluidic passage, or obstructions, which may be included within each of the more tortuous sections, may decrease in size from one more tortuous section to the next. These various pressure-drop producing or pressure-drop managing features are desirably so employed such that the principal and secondary fluidic passages are balanced relative to each other, in that a first working fluid entering the principal fluidic passage at a first flow rate and a second working fluid entering the secondary passage at a second flow rate will mix essentially only in the principal fluidic passage, and generally not in the secondary fluidic passage.

According to one alternative embodiment of the invention, the successive more tortuous sections may optionally vary from each other for reasons other than pressure balancing, if desired. By altering the design and/or length of the more tortuous sections, the mixing efficiency at each such section may be varied as desired. Pressure balancing may again be optimized by a complementary design of the secondary fluidic passage.

According to one embodiment of the present invention, the principal fluidic passage, one or more secondary fluidic passages, and the at least one passage for thermal control fluid are all contained within a single unitary body. The body may desirably comprise glass or glass-ceramic, but may also usefully be formed of other materials, such as ceramic, metal, and plastic.

In an alternative embodiment, the principal fluidic passage and at least one passage for thermal control fluid are contained within a first unitary body, and the secondary fluidic passage is contained within a secondary unitary body, with the exits from the secondary fluidic passage coupled to the secondary entrances of the principal fluidic passage via one multi-path or multiple individual fluidic couplings. In this embodiment, the secondary unitary body may contain a second or additional passage for a thermal control fluid, which may be supplied or controlled separately from the at least one passage for thermal control fluid in the first unitary body.

The resulting device achieves greater thermal control and higher throughput more economically than previously existing or previously proposed microfluidic devices. As a result of the features of the device and method described briefly above, a reaction or mixing process performed in the device is spread serially along the principal fluidic passage, rather than performed in massively parallel fashion in very small cross-sectional-area passages, as with typical numbered-up devices. Tighter thermal control is achieved without reduced passage size and the associated need for parallelism to overcome lower throughput. Since the need for numbering up is lessened, the expense of precision pumps for external numbering up is minimized, and the risk and expense of poorly controlled fluid balancing that typically occurs in internal numbering up are avoided.

Thermal control is also enhanced relative to microreaction devices employing parallel numbering up (or even employing a single unitary mixer) because the serial configuration of the present invention inevitably results in a lower adiabatic temperature rise (or decrease) than even the most finely divided parallel reaction design. This is because the energy produced (or consumed) by the reaction at a given one of the mixers in the devices of the present type is spread throughout a greater mass of fluid than in a parallel numbered-up reactor or unitary reactor, since the entire primary passage reactant stream is present at every reaction point. Assuming equal flows and thermal mass flows in the principal and secondary passages, for example, and equal division of flows out from four exits the secondary passage, the baseline adiabatic temperature change at the first confluence or first mixer location (where the total mass flow is the least) in devices of the present invention is only ⅖ of the adiabatic temperature change of an equal-splitting parallel mixer architecture. If the total thermal mass flow is greater in the principal passage than in the secondary passage, the advantage of the present invention only increases. For example, where the ratio of thermal mass flow rates of the principal passage to the secondary passage is 2:1, the adiabatic temperature change in a device of the present invention having four exits from the secondary passage is only ⅓ that of a parallel or unitary mixer, at the first mixing or confluence point.

According to the invention, flow splitting for separate flow distribution is employed only in one or more secondary fluidic passages, but not in the principal fluidic passage. Further, the flow splitting in the secondary fluidic passage is of a different type than in traditional microreactors with internal (or external) numbering up. Instead of many parallel flows at equal pressures and flow rates, successive serial splits or exits from the secondary fluid passage at different pressures are used. Passage features, such as sub-passage lengths, which vary along the passage from one exit to the next, are used to provide lower pressure at each successive exit. The pressure drop thus induced matches the pressure drop of the fluid in the associated principal fluidic passage, thus guaranteeing that fluid in the principal fluidic passage does not leave that passage, and that mixing and/or reaction processes take place essentially all in the principal fluidic passage and essentially not in the secondary fluidic passage.

The successive serial mixing or dosing of one reactant into another provided by the present invention also improves local molar ratio control over previous microreactor architectures of similar throughput capability. Because the secondary passage reactant is introduced in small amounts relative to the total flow, the secondary passage reactant is effectively dosed into the principal passage reactant and the possibility is minimized of any buildup of localized excess amounts of that reactant.

Further, in contrast to the typical parallel-numbering-up schemes in previous microreaction devices, any flow imbalance that may exist or arise in the devices of the present invention between the various split flows of the secondary passage are not performance-critical. The parallel nature of previous devices results in the need for flow splitting of both or all incoming reactant streams, such that imbalance in one reactant passage typically results directly in over-molar-ratio conditions at least one location in the microreaction device. One such imbalance can also compound with another, so that very small imbalances may have very large effects, particularly in more sensitive reactions.

In the present invention, in contrast, for the large number of reactions which are well-behaved with molar ratios of one or more reactants at or below a target level, the proper conditions for a well-behaved reaction can generally be readily maintained regardless of any flow variations in the secondary fluidic passage. As long as the pressure balances are appropriate to confine the reactant stream entering the principal passage to that passage, and as long as the flows at the primary entrances are at the desired molar ratio or even tilted toward the well-behaved side, any imbalance in flow rates from the secondary passage into the principal passage cannot cause unfavorable over-molar-ratio conditions. The result is stable, reliable, repeatable reaction performance.

If the secondary fluidic passage is provided within a secondary unitary body, as according to one of the alternative embodiments of the present invention, multiple alternate secondary unitary bodies may be supplied as a part of the inventive device or system. The secondary fluidic passages of at least some of the multiple alternate secondary unitary bodies can vary in one or more physical parameters from those of one or more others of the secondary unitary bodies, such that proper pressure balancing can be maintained over a wide range of reactant or working fluid types and flows by switching out one secondary fluidic passage for another. This avoids both the expense of multiple precision pumps on the one hand, and the expense of a microreaction device with internal flow splitting optimized only for a single reaction or reaction type on the other hand. Instead, a simple external component can be provided in several interchangeable types to handle serial flow splitting and pressure management for a wide range of reactant or working fluid types and flow rates. Where highest flexibility over varying operating conditions is required, however, multiple pumps or other variable external control may of course be the most desirable and most economical solution.

Another aspect of the present invention is the secondary body itself, which forms a manifold device comprising at least one working fluidic passage (corresponding to the secondary working fluidic passage of other embodiments) having an average cross-sectional area in the range of 0.25 to 100 $mm^2$, said working fluidic passage having an entrance at a first end thereof communicating with the exterior of the device and multiple exits totaling at least three positioned serially at spaced locations along the length thereof also communicating with the exterior of the device. The multiple exits including a final exit at the end of the working passage, which passage varies in one or more of length, cross-sectional area, number of flow restrictors and size of flow restrictors from one exit to the next, such that pressure drop, normalized at a given fixed flow rate and viscosity, is greater between the second and third exits than between the first and second exits.

In another aspect of the present invention, a microreaction device is provided comprising at least one thermal control fluidic passage and a principal working fluidic passage with average cross-sectional area in the range of 0.25 to 100 $mm^2$, with the principal fluidic passage having a primary entrance and multiple secondary entrances positioned serially at spaced locations along its length, with both primary and secondary entrances communicating with the exterior of the device. The spacing between secondary entrances has a length along the principal fluidic passage of at least two times the root of the average cross-sectional area of the principal fluidic passage. The principal fluidic passage includes a mixing section and a dwell-time section, in order, between each one of the multiple secondary entrances. The mixing section is desirably a narrower more tortuous section and the dwell-time section is desirably a broader less tortuous section of the principal fluidic passage. In devices according to this aspect of the invention, no secondary passage is provided within the device. Fluid feeding devices such as individual pumps or a serial manifold such as is disclosed herein may be employed at the option of the user. This allows for variations on the basic method of using serially-numbered-up mixers to mix two reactants. For example, where less than the total number of secondary entrances is used for the second reactant, additional secondary entrances may be used for other purposes such as feeding other fluids such as chemical or thermal quenching fluids in between second reactant feeds, or such as feeding additional reactants for additional types of reactions.

In yet another variation of device the present invention, more than one set of secondary entrances may be provided into the principal fluidic passage, such that two differing fluid streams may be added at multiple points along the principal passage. Such a device may or may not include one or two integrated secondary fluid passages to feed the respective sets of multiple secondary entrances.

In general, the devices of the present invention, by keeping relatively larger cross-sectional areas, relative to microfluidic devices of similar thermal control capability, the devices of the present invention also offer the potential of decreased fouling and clogging tendencies.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principals and operations of the invention.

DETAILED DESCRIPTION

Figure 1:
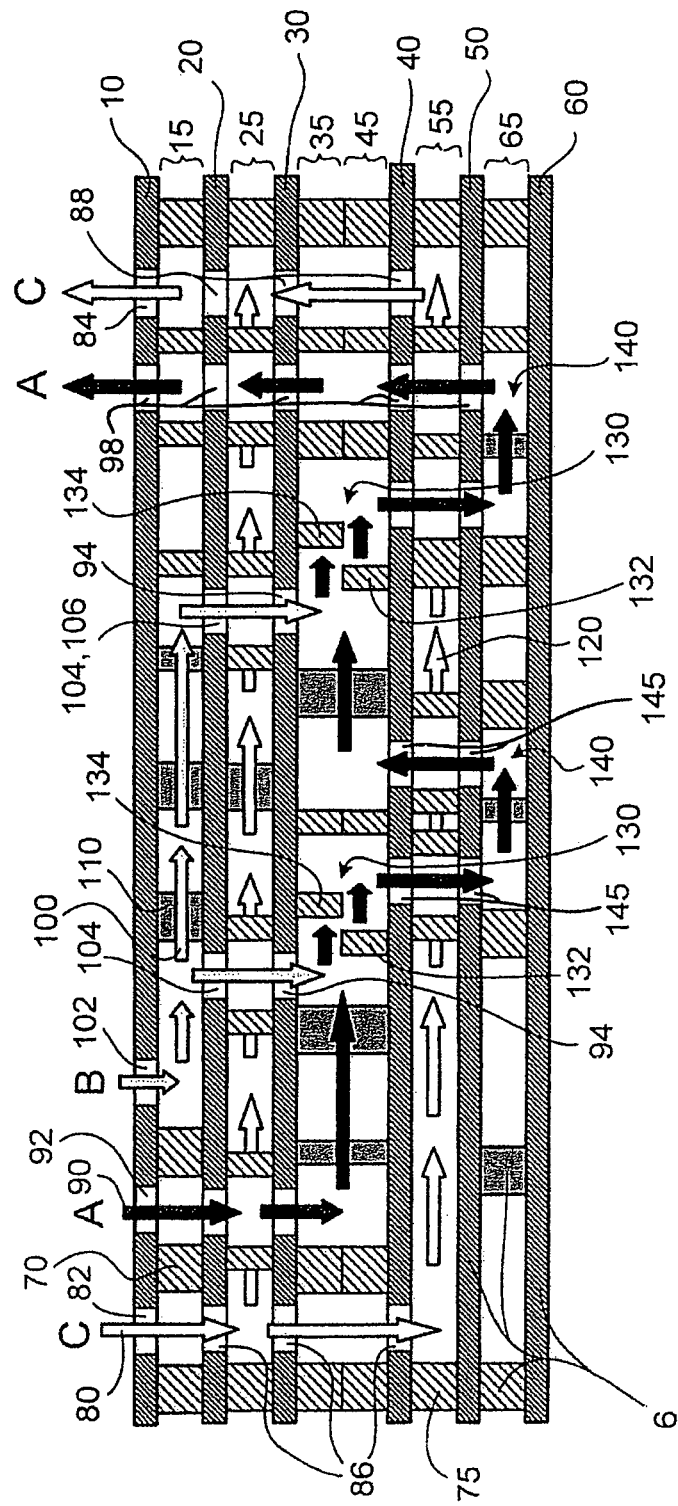
FIG. 1 is a diagrammatic cross-section of one embodiment of a microfluidic device of the present invention.

FIG. 1 is a diagrammatic cross-section of one embodiment of a microfluidic device 4 of the present invention. The representation in FIG. 1 reflects and represents to a degree the currently preferred fabrication methods used by applicants to realize devices according to the present invention, but the invention is not limited to devices made by such methods.

According to those methods, walls of the microfluidic device are formed by shaping glass frit, such as by molding, on a glass substrate. Structures thus formed are later stacked and sintered together to form a one-piece or unitary device. For a fuller description of manufacturing methods of this type, see for example U.S. Pat. No. 6,769,444, assigned to the assignee of the present application. The method is reflected in the Figure in that substrates 10, 20, 30, 40, 50, and 60, of glass or other appropriate material, are each associated with a plurality of layers of wall structures 15, 25, 35, 45, 55, and 65. To make the device, the corresponding wall structure is formed onto its corresponding substrate, then the substrates with structures thereon are stacked and sintered together, forming a unitary structure 6 of which the device 4 is comprised. Note that two wall structures, wall structures 35 and 45, are positioned in the space between substrates 30 and 40. The device of the embodiment of FIG. 1 thus includes six substrates and six wall structures initially formed thereon, with wall structures 35 and 45 positioned against each other and sintered together in the final device.

In FIG. 1, wall structures are represented in cross section (with cross-hatching) to stand for walls that divide one or more of the illustrated fluid passages within the plane of the figure, such as wall 70 that divides a thermal control fluidic passage C, indicated by the white arrows 80 from a principal fluidic passage A, indicated by the black arrows 90, or for walls that define the outer edges of the device, such as wall 75. Wall structures represented as shaded, such as wall 110, are in the background and do not divide the illustrated passages, at least not within the plane shown. Where walls are in the background, arrows such as arrow 100 are used to represent that fact. Where walls that are represented in cross-section confine one flow path but not another, arrows such as arrow 120 are shown passing behind the structures to illustrate the flow path(s). Dimensions and basic spatial relationships are for ease of illustration only and are not proportional or to scale. The cross-section and the paths illustrated therein are also simplified for ease of illustration.

As mentioned above, the embodiment represented in FIG. 1 includes a fluid passage C for a thermal control or thermal buffer fluid, with flow directions as generally indicated by the white arrows 80. Fluid passage C includes an entrance 82 and an exit 84, and is divided within the device 4 into two layers, a first layer between substrates 20 and 30 and a second layer between substrates 40 and 50. Holes 86 and 88 through the respective substrates allow the fluid in fluid passage C to reach the first and second layers. As a variation on the embodiment shown, third, or third and fourth layers of fluid passage C may also be employed, with the third layer either at the top above all the layers shown or at the bottom below all the layers shown and the forth, if present, at the other extreme.

The embodiment of the invention represented in FIG. 1 also includes a principal flow passage A represented by the black arrows 90. The principal flow passage A includes a primary entrance 92 from which the passage moves directly through substrates 10, 20, and 30 and into the space between substrates 30 and 40. The principal fluidic passage A further includes additional entrances or "secondary" entrances 94 (two are shown).

The cross-sectional area of the principal fluidic passage A is generally in the range of 0.25 to 100 mm$^2$, desirably within the range of 0.3 to 20 mm$^2$, and more desirably within the range of 0.5 to 6 mm$^2$. The spacing along the principal fluidic passage A between successive ones of secondary entrances 94 is preferably at least two times the root of the average cross-sectional area of the passage, such that fluid flowing in the principal fluidic passage has a non-negligible time and space in which to mix or begin mixing and/or to react or begin reacting, with any fluid entering at a given secondary entrance, before reaching the next secondary entrance.

Between successive ones of secondary entrances 94, and after the last such entrance 94, the principal path includes, in order along the direction away from the entrance 92, a mixing section in the form of a narrower, more tortuous section 130 (created in part by cooperating walls 132 and 134 within wall structures 45 and 35), and a dwell-time section in the form of a broader, less tortuous section 140, located in this embodiment in the space between substrates 50 and 60 and accessed via holes 145 through substrates 40 and 50. The narrower, more tortuous sections 130 constitute mixing sections having desired mixing effects at the cost of some pressure drop. Although narrower, more tortuous sections are believed preferable, as an alternative to such narrower, more tortuous sections, mixing sections may be formed of passage sections with patterned floors or walls, for example, with the patterns arranged to induce mixing. The dwell-time sections in the form of broader, less tortuous sections 140 effectively provide some desired dwell time, with very minimal pressure drop, during which time reaction, heat exchange, or other processes can take place or continue to take place. A sufficient volume is generally desirable for the broader, less tortuous sections 140, such that reaction and thermal tempering have time to occur before the next more tortuous section 130. Holes 98 through the various respective substrates form an exit from the principal flow passage A at the downstream end thereof.

As may be seen in FIG. 1, each more tortuous section 130 and each broader, less tortuous section 140 of passage A share a common wall with the thermal control fluid passage C: for each section 130 substrate 40 is a common wall with passage C, while for each section 140 substrate 50 is a common wall with passage C. This arrangement provides for direct thermal control or heat exchange at each more tortuous section 130 and at each broader, less tortuous section 140 of principal passage A.

The device of the embodiment of FIG. 1 also includes a secondary working fluidic passage B, with flow path as generally indicated by the light grey arrows 100, and desirably having an cross-sectional area within the range of 0.25 to 100 $mm^2$, desirably within the range of 0.3 to 20 $mm^2$, and more desirably within the range of 0.5 to 6 $mm^2$. The secondary fluidic passage B has an entrance 102 and multiple exits 104 including a final exit 106. Each exit 104 is in fluid communication with a corresponding one of the multiple secondary entrances 94 of the principal fluidic passage A, with the exits and secondary entrances paired in order from those nearest to the entrances 92, 102 of the two passages to those furthest from the entrances.

Secondary fluidic passage B desirably has relatively high length-dimensions between successive exits 104 relative to the passage's cross-sectional dimensions. This allows for a desired amount of pressure drop to be reliably and consistently provided within the secondary fluidic passage B. Although not shown in the illustration of FIG. 1 where only two exits 104 are shown, the distance along the secondary passage B between exits 104 from the secondary passage desirably increases from one exit to the next in the direction away from the entrance 102. This allows an appropriate additional pressure drop to be generated within the secondary fluidic passage B between successive exits 104, despite decreasing flow rates as fluid leaves through the successive multiple exits 104. In other words, pressure drop along the secondary working fluidic passage, normalized at a given flow rate and viscosity, increases between each successive pair of exits in the direction away from the entrance. Alternatively or in addition, the cross-sectional area of the secondary fluidic passage 104 may generally decrease in the direction away from the entrance 102 so as to provide the appropriate pressure drop.

As a further additional or alternative means of providing appropriate pressure drop or pressure matching between the principal and secondary fluidic passages A and B, the successive more tortuous sections 130 of the principal fluidic passage may increase in average cross-sectional diameter in the direction away from the entrance 92 of the principal fluidic passage A, or obstructions such as cooperating walls 132 and 134 or the like, which may be included within each of the more tortuous sections, may decrease in size from one more tortuous section 130 to the next. These various pressure-drop producing or pressure-drop managing features are desirably so employed that the principal and secondary fluidic passages A and B are balanced relative to each other, in that a first working fluid entering the principal fluidic passage at a first flow rate and a second working fluid entering the secondary passage at a second flow rate will mix essentially only in the principal fluidic passage, and generally not in the secondary fluidic passage.

According to the embodiment of the present invention illustrated in FIG. 1, the principal fluidic passage A, a secondary fluidic passage B, and a passage C for thermal control fluid are all contained within a single unitary body 6. The body 6 may desirably comprise glass, glass-ceramic, or ceramic, and be manufactured as described and referenced above. The unitary body 6 may also usefully be formed of other materials, such as metal or plastic. As an additional alternative, the body 6 may be non-unitary, that is, disassemblable for repair or cleaning.

Figure 2:
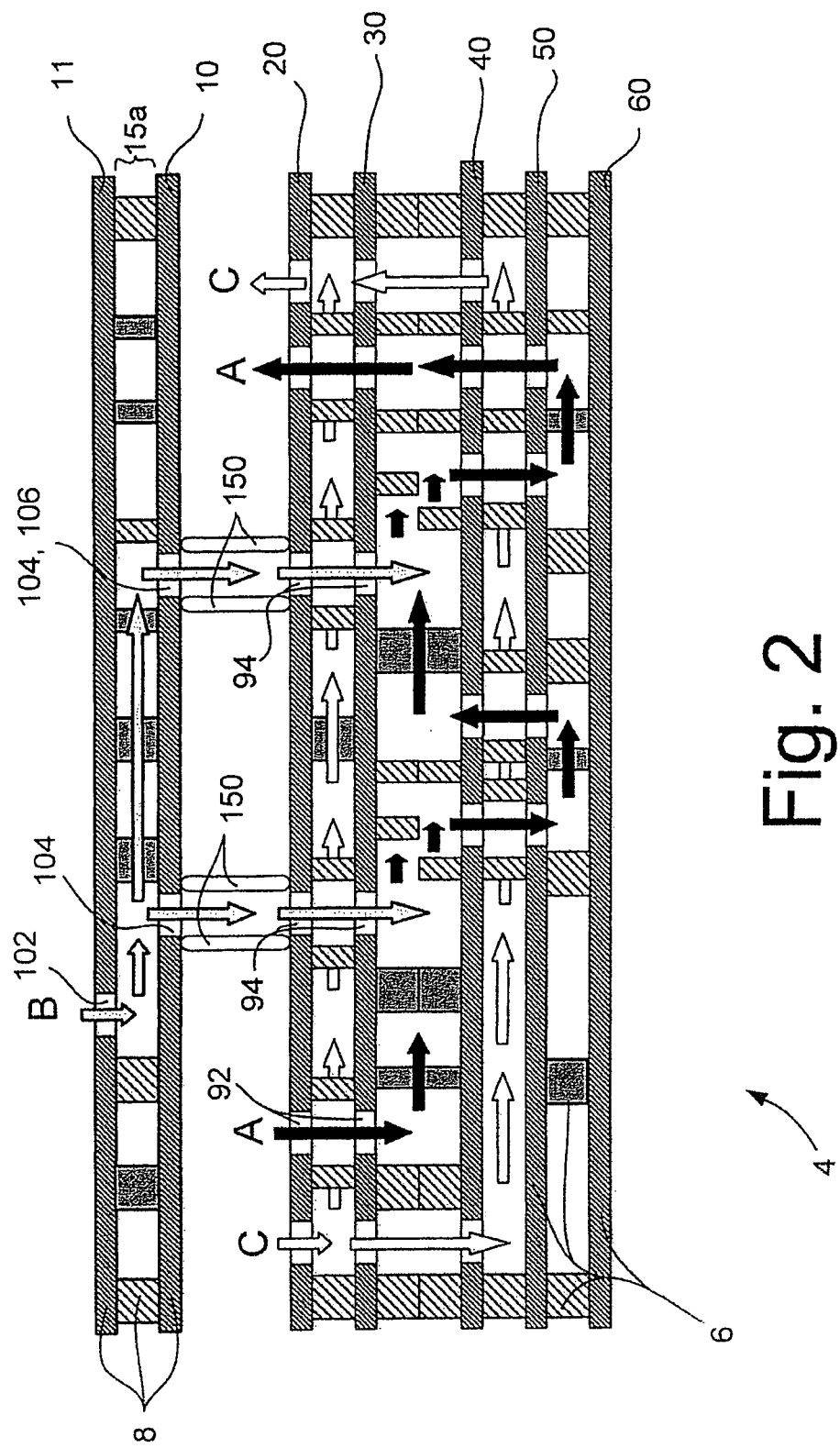
FIG. 2 is a diagrammatic cross-section of another embodiment of a microfluidic device or system of the present invention.

FIG. 2 is a diagrammatic cross-section of another embodiment of a microreaction device or system 4 of the present invention. The device or system includes two unitary pieces in the form of a first unitary body 6 and second unitary body 8, coupled by fluidic couplings 150. In the device or system 4 of the alternative embodiment of FIG. 2, the principal fluidic passage A and at least one passage C for thermal control fluid are contained within the first unitary body 6, and the secondary fluidic passage B is contained within the secondary unitary body 8, with the exits 104 of the secondary fluidic passage B coupled to the secondary entrances 94 of the principal fluidic passage A via multiple individual fluidic couplings 150. As a variation of the embodiment of FIG. 2, a single fluid coupling may also be employed, the coupling having multiple channels corresponding to fluidic couplings 150.

Figure 3:
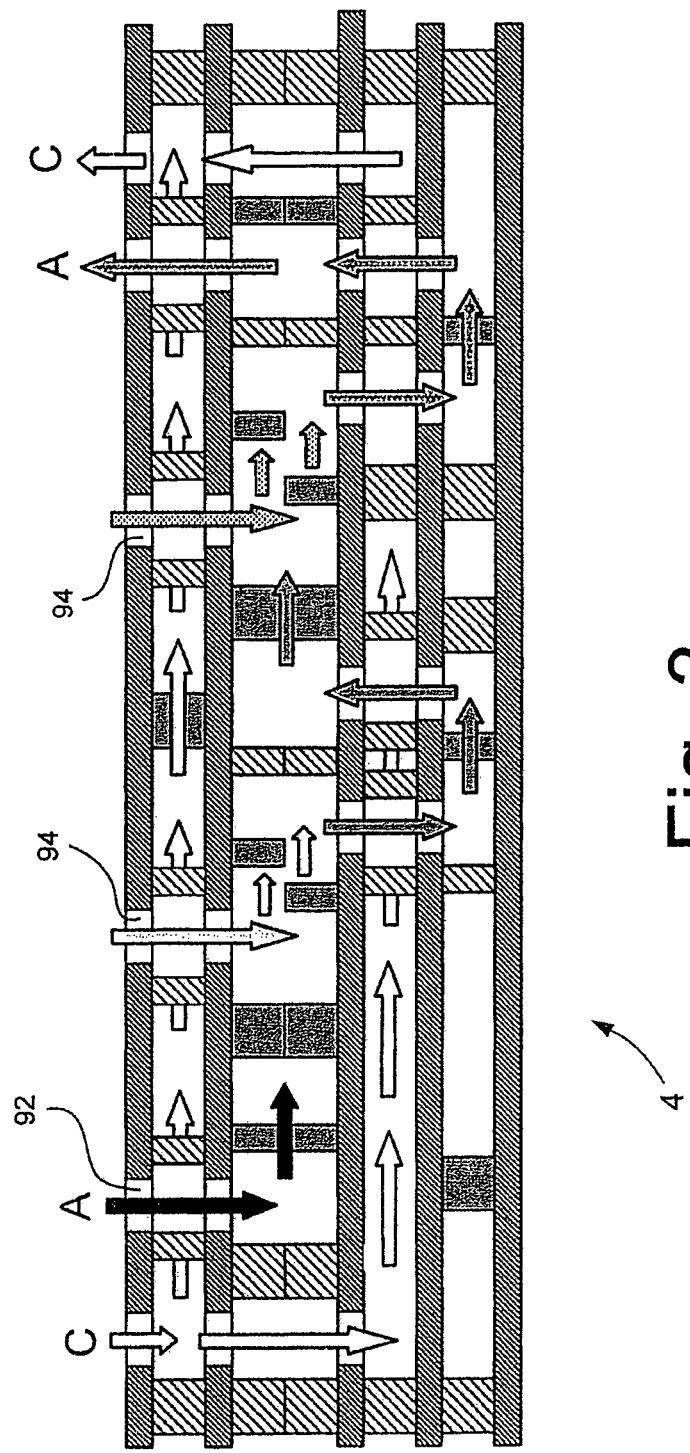
FIG. 3 is diagrammatic cross-section of another embodiment of a microfluidic device of the present invention.

The cross-section of FIG. 3 shows another aspect of the present invention, a microreaction device 4 corresponding to the body 6 of FIG. 2 but used without body 8 of FIG. 2, by flowing a first reactant or working fluid into the primary entrance 92, while flowing a second reactant or working fluid into the multiple secondary entrances 94. This may be performed with a separate pump for each entrance 94 or with other fluid control as desired by the user.

Figure 4:
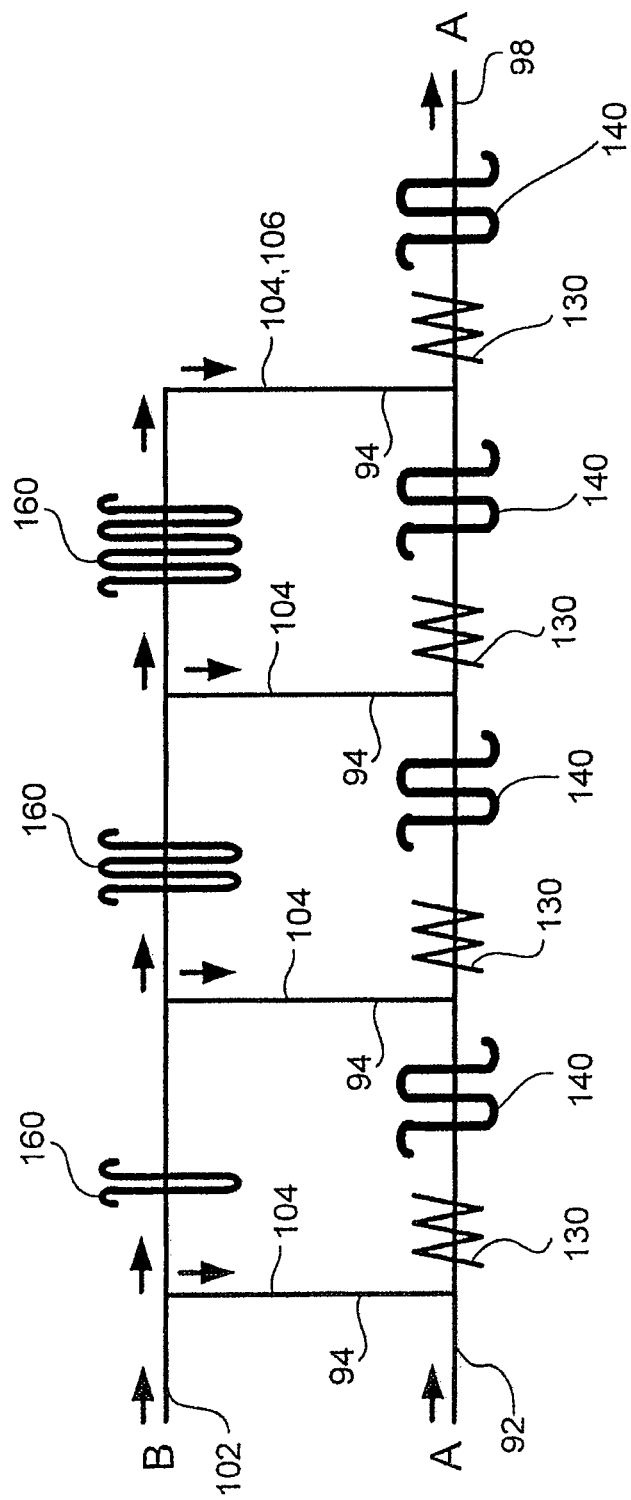
FIG. 4 is a schematic diagram illustrating the relationship of certain fluidic elements existing in certain embodiments of the present invention.

Certain aspects of the relationship between the principal fluidic passage and the one or more secondary fluidic passages of the present invention, as well as other features or aspects of the present invention, may be understood by reference to the schematic diagrams of FIGS. 4-7. FIG. 4 is a schematic diagram illustrating some aspects of the relationship between principal fluidic passage A and one secondary fluidic passage B in one embodiment of the present invention similar to the embodiments shown in FIGS. 1 and 2.

Referring to FIG. 4, principal fluidic passage A is represented by the lower horizontal line, from entrance 92 to exit 98. Multiple secondary entrances 94 are spaced serially along principal passage A. Along principal passage A, between successive ones of secondary entrances 94 and between the last of exits 94 and the exit 98, are positioned, in order along the direction away from the entrance 92, narrower, more tortuous sections 130 of passage A (represented schematically by an angular, zigzag line), and broader, less tortuous sections 140 of passage A (represented schematically by a broadly curved line). Secondary passage B is represented by the upper horizontal line, from entrance 102 to final exit 106. Multiple exits 104, including final exit 106, are positioned serially along passage B. The exits 104 of secondary passage B are in fluid communication with the respective secondary entrances 94 of the principal passage A.

Pressure managing elements, in this embodiment in the form of extended length sections 160 of secondary passage B, are positioned between each successive exit 104. The extended length sections 160, represented schematically by a tightly curved line, desirably have relatively large ratios of length-to-cross sectional dimension, so that a desired pressure drop can be reliably induced. As represented in the figure, the distance along the secondary fluidic passage B between successive ones of multiple exits 104, in the direction away from the entrance 102, desirably increases from each successive exit 104 to the next, thus allowing each successive exit to be at reduced pressure relative to the previous one, so as to generally match the pressures in principal passage A at each respective secondary entrance 94.

The pressure balancing of the present invention helps ensure that any mixing or reaction of fluids entering passage A with fluids entering passage B occurs essentially only in passage A. Using increasing distance along the secondary fluidic passage B between successive ones of multiple exits 104 to balance the pressure has the advantage over some alternatives in that manufacturing tolerances are relaxed, since the pressure drop, for a given flow and viscosity, then depends mainly on the relatively long length dimension of the fluidic path, and any manufacturing variations in the length are typically correspondingly small relative to the that length. As mentioned above, however, such pressure balancing may also be achieved, wholly or in part, by alternate means, such as decreases in the width or cross section of passage B, in the direction away from entrance 102, and such as variations within the structures of passage A.

Figure 5:
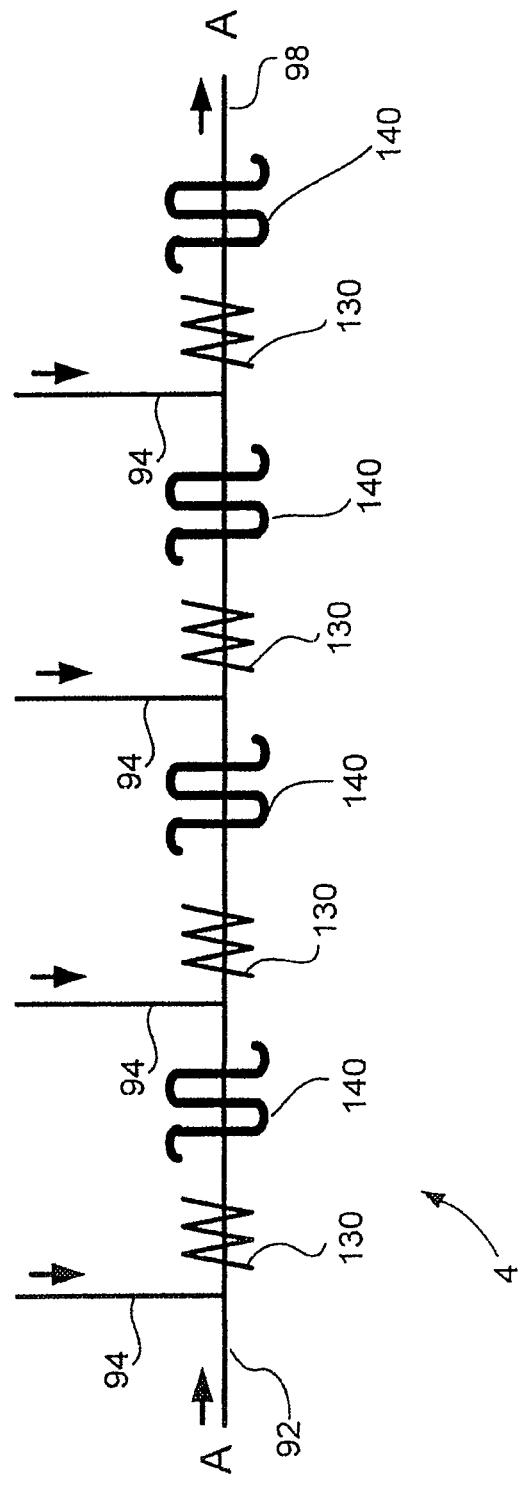
FIG. 5 is a schematic diagram illustrating the relationship of certain fluidic elements existing in certain other embodiments of the present invention.

The schematic diagram of FIG. 5 shows elements of the fluidic path of a device 4 of the type shown in FIG. 3, where the principal fluidic passage A has multiple secondary entrances 94 directly accessible from the exterior of the device 4. In one method according to the present invention, a first reactant can be flowed into the device at the entrance to passage A, while a second reactant may be flowed into multiple of, or each of, the secondary entrances 94. In the case that not every one of the secondary entrances 94 is used for a second reactant, some of the entrances may be used for other purposes, for example, for adding other reactants for multi-step reactions or for adding thermal or chemical quenching agents in between addition of reactant.

Figure 6:
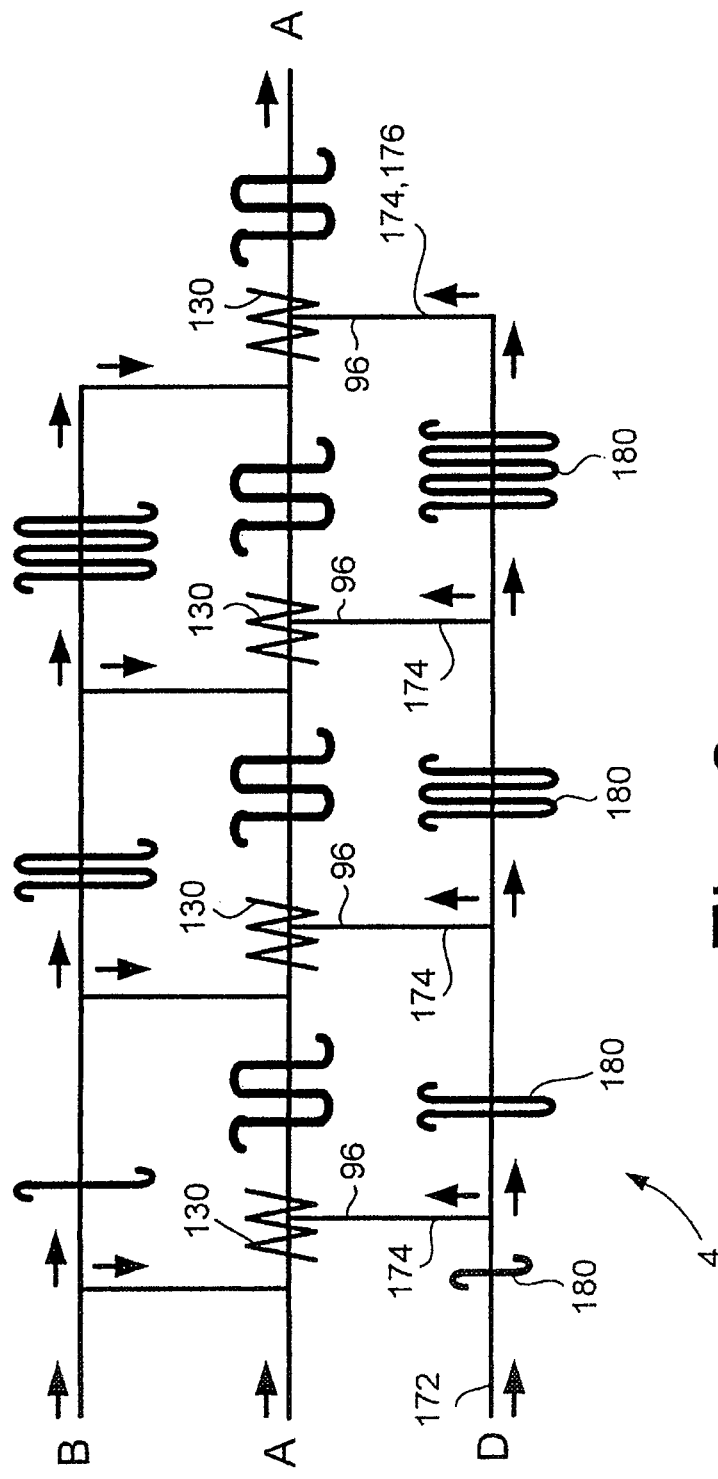
FIG. 6 is a schematic diagram illustrating the relationship of certain fluidic elements existing in still other embodiments of the present invention.

A further embodiment of the invention is represented schematically in FIG. 6. The embodiment of FIG. 6 adds an additional secondary fluidic passage D relative to the embodiment of FIG. 4. Similarly to secondary passage B, additional secondary passage D has an entrance 172, and multiple exits 174, including final exit 176. The embodiment of FIG. 5 also includes additional secondary entrances 96 into principal fluidic passage A. These are in respective fluid communication with the multiple exits 174 of additional secondary fluidic passage D.

The additional secondary fluidic passage D may be employed to introduce an additional reactant stream or working fluid, including working fluids other than reactants, such as heating or quenching agents, or others, into the principal passage A. In this embodiment, the additional secondary entrances 96 are positioned in the middle of the respective narrower, more tortuous sections 130 of passage A, which allows introduction of the fluid from passage D after some mixing, but before the decrease of mixing activity associated with the end of a given more tortuous section 130. Other positions may also be selected. Either or both of secondary passages B and D may be included within separate unitary bodies from that of principal passage A, coupled by fluidic coupling(s) as in the embodiment of FIG. 2, or may either or both be integrated within a single unitary body including principal passage A, such as in the embodiment of FIG. 1.

Figure 7:
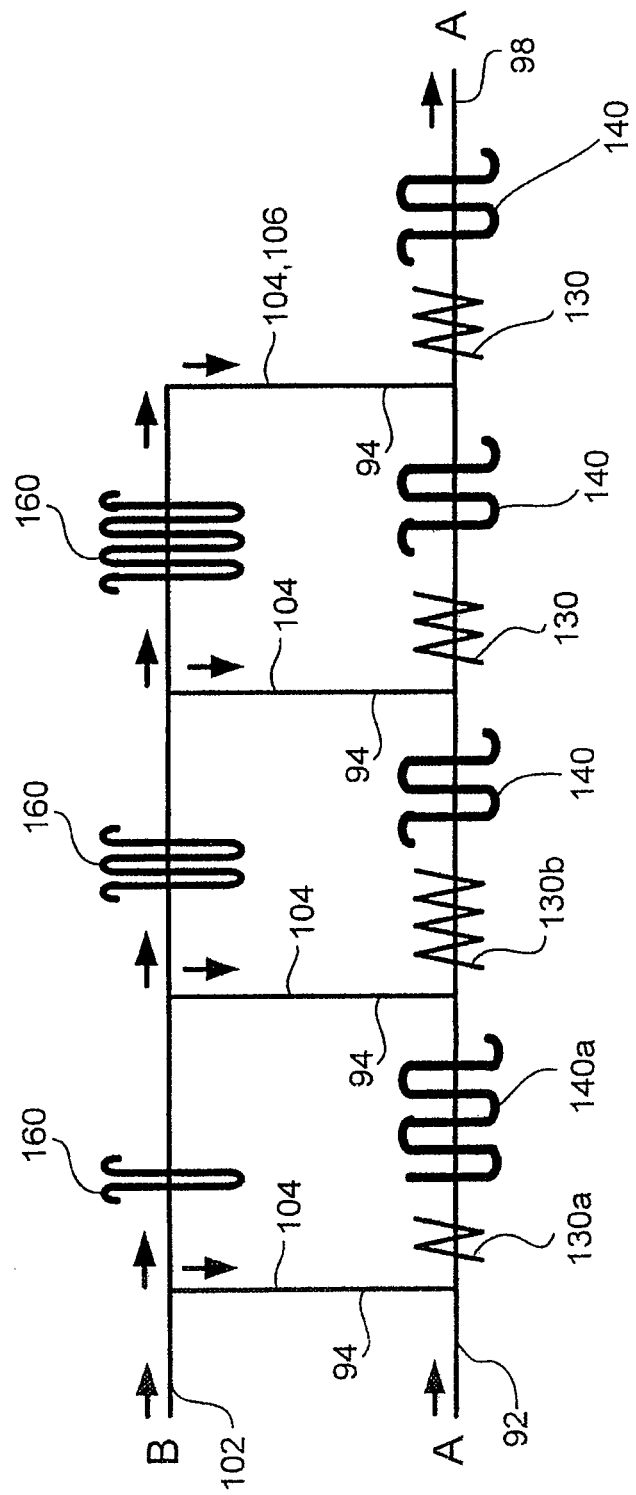
FIG. 7 is a schematic diagram illustrating the relationship of certain fluidic elements existing in yet other embodiments of the present invention.

Still another embodiment of the invention is represented schematically in FIG. 7. In the embodiment of FIG. 7, one or more of the narrower more tortuous sections of the principal fluidic passage A varies from one or more others of the narrower more tortuous sections of the principal fluidic passage A. In the particular embodiment shown, an alternative narrower more tortuous section 130a is shorter than the narrower more tortuous sections 130, and another alternative narrower more tortuous section 130b is longer than the narrower more tortuous sections 130. Such variation can allow the inventive device to provide for different types or degrees of mixing, such both fast and relatively slower mixing, for example, at different confluence points of principal fluidic passage A and secondary fluidic passage B. Variations may also be employed in the broader, less tortuous sections of passage A, such as the alternative longer section 140a of passage A shown in the Figure, and corresponding variations may be provided within the secondary passage B to provided the desired pressure balancing such that reaction takes place in passage A and not in passage B. The variations in mixing type or mixing speed and dwell time length and the like can be customized for particular reactions, such as multi-stage, multi-component reactions. As with the embodiment of FIG. 6, the principal passage A and the secondary passage B may be contained within a single unitary body or may be housed within respective individual unitary bodies.

Figure 8:
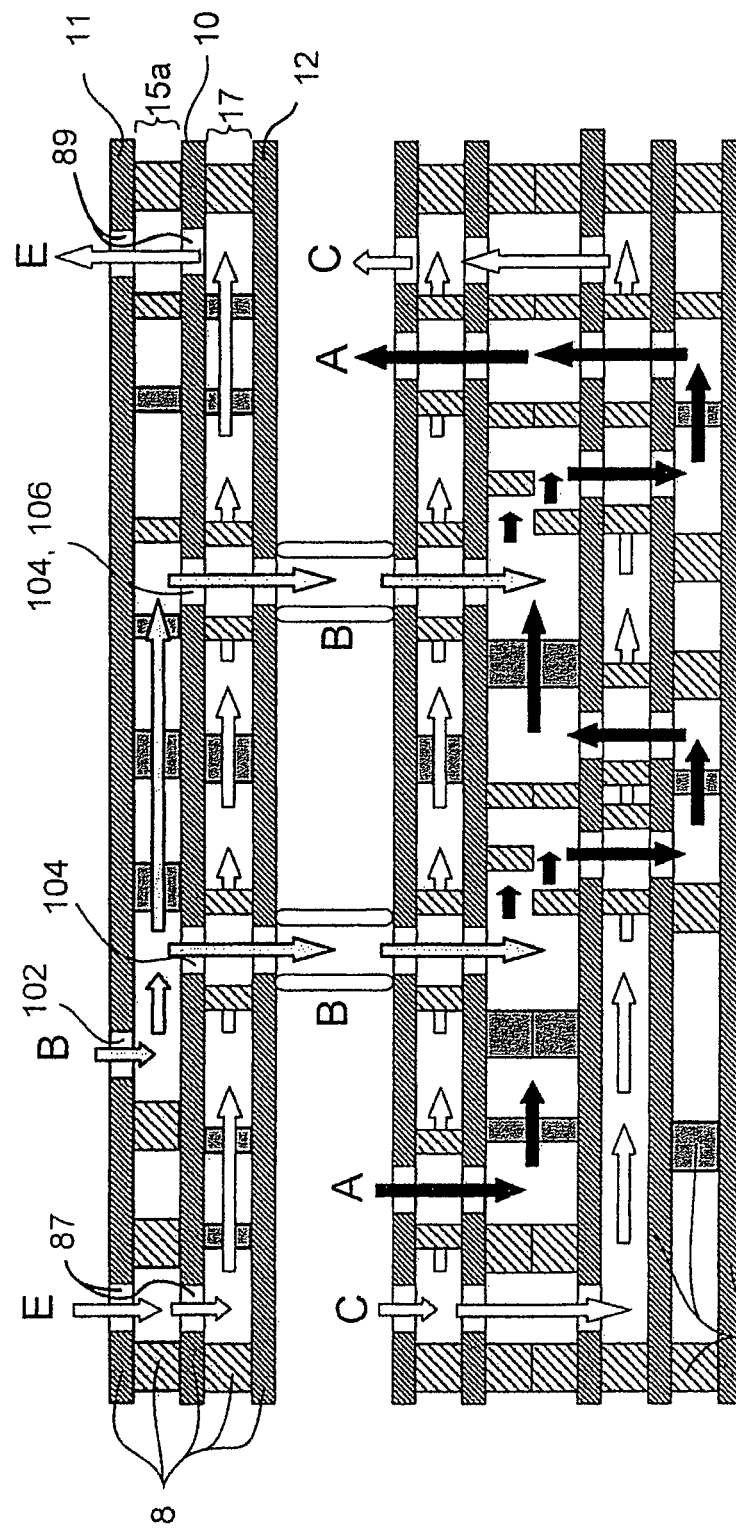
FIG. 8 is a diagrammatic cross-section of still another embodiment of a microfluidic device or system of the present invention.

FIG. 8 is a diagrammatic cross-section of still another embodiment of a microreaction device 4 of the present invention. In the device 4 of the alternative embodiment of FIG. 8, the principal fluidic passage A and at least one passage C for thermal control fluid are contained within a first unitary body 6, and the secondary fluidic passage B is contained, together with an additional passage E for thermal control fluid, within the secondary unitary body 8. The exits 104 of the secondary fluidic passage B are coupled to the secondary entrances 94 of the principal fluidic passage A via multiple individual fluidic couplings 150. As in the embodiment of FIG. 2, a single fluid coupling with multiple channels may also be employed if desired. The embodiment of FIG. 8 allows for pre-heating or pre-cooling of the reactant in secondary fluidic passage B, and even allows for maintaining the reactant entering through secondary passage B a different temperature than the reactant entering through the primary entrance 92 to passage A, if desired.

FIGS. 9-13 are respective plan views of wall structures that may be used to form another embodiment of the unitary body 6 of FIG. 2 or a similar structure. The relative sizes of features in the drawings of FIGS. 9-13, and 14 and 15 are generally on an internally consistent scale, and are shown at approximately 1:1.

Figure 9:
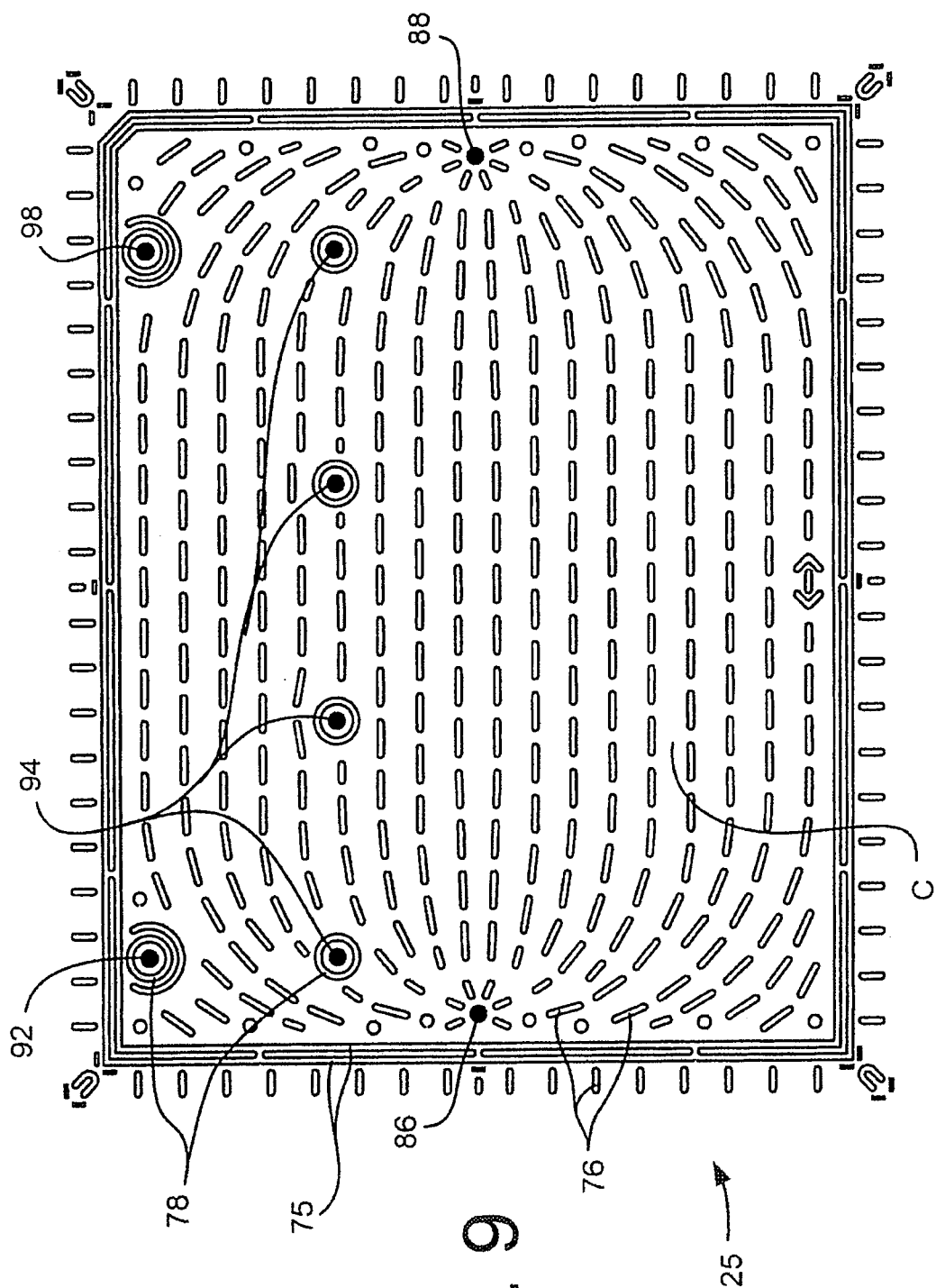
FIGS. 9-13 are respective plan views of wall structures that may form an embodiment of the unitary body 6 of FIG. 2 or a similar structure.

FIG. 9 is a plan view of the wall structures 25 such as would be originally formed on a substrate 20 as shown in FIG. 2. The wall structures 25 shown in FIG. 9 include wall structures 75 that define the outer walls of the device, wall structures 76 that provide support and strength, and may serve to guide the relevant fluid as in the example shown, and wall structures 78 that serve to confine a fluid and pass it through the layer in which the wall structures reside. Locations of holes in the corresponding substrate 20 are shown as large black circles. Some simply pass the relevant fluid through the layer formed by the wall structures 25. These and include primary entrance 92 to passage A, secondary entrances 94 to passage A, and hole 98 that constitutes an exit from passage A. Holes 86 and 88 provide access to the layer defined by wall structures 25, which forms part of thermal control fluid passage C. Supporting wall structures 76 radiate from the locations of holes 86 and 88 to guide the thermal control fluid into a more or less uniform flow pattern within the layer.

Figure 10:
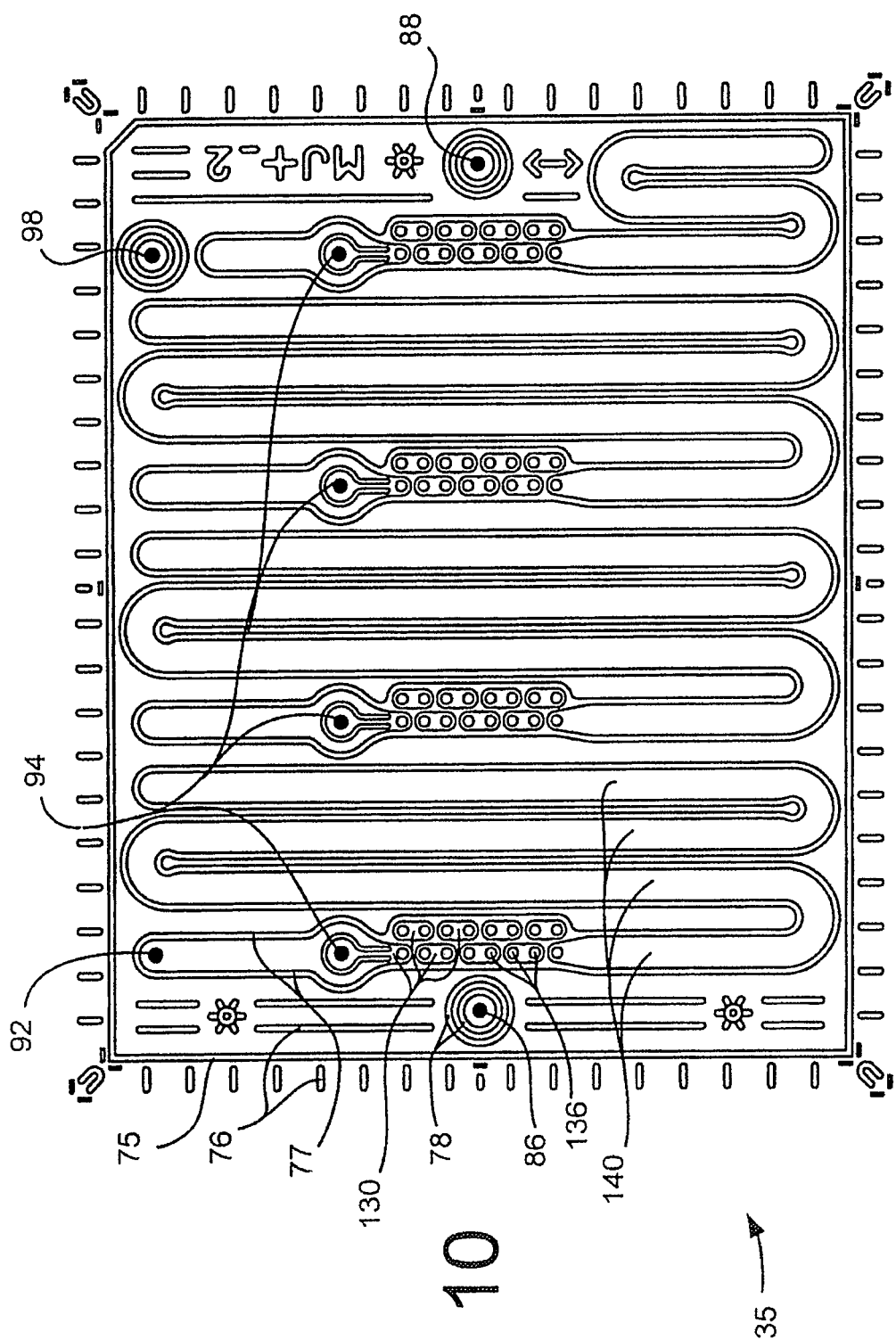

FIG. 10 is a plan view of the wall structures 35 such as would be originally formed on substrate 30 as shown in FIG. 2. The wall structures 35 shown in FIG. 10 include wall structures 75 that define the outer walls of the device, wall structures 76 that provide support and strength, wall structures 77 that serve to confine a fluid and guide it within the layer defined by the wall structures 35, and wall structures 78 that serve to confine a fluid and pass it through the layer in which the wall structures 35 reside. Holes in the corresponding substrate 30 are also shown. Those that pass the relevant fluid through the layer include holes 86 and 88 which are part of passage C, and hole 98 that forms part of the exit from passage A. Holes that provide access to the layer defined by wall structures 35 (and in part by wall structures 45 shown below, since they abut each other as shown in FIG. 2) include the primary entrance 92 to passage A and multiple secondary entrances 94 to passage A, in this case, four total. The wall structures 35 shown in FIG. 10 define part of the narrower, more tortuous section 130 of the passage A as a series of ovoid cavities oriented vertically in the Figure. As part of the wall structures 35, each such cavity also includes, at each end, an obstruction in the form of a post 136. The wall structures 35 also define a portion of the broader, less tortuous section 140 of the passage A, which in the embodiment of FIGS. 9-13 is located between substrates 40 and 50 and between substrates 50 and 60.

Figure 11:
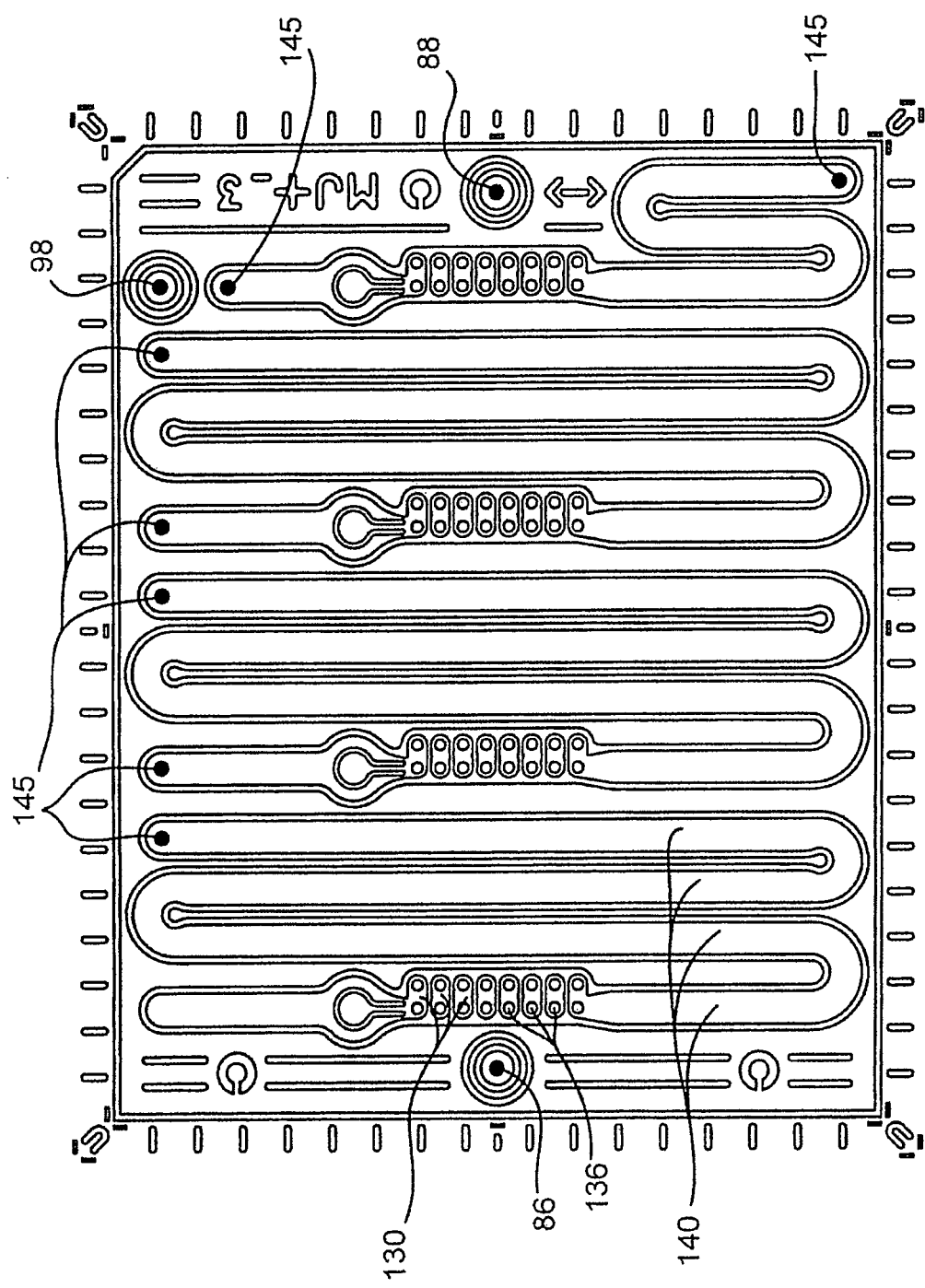

FIG. 11 is a plan view of the wall structures 45 such as would be originally formed on substrate 40 as shown in FIG. 2. The wall structures 45 shown in FIG. 11 include wall structures serving the same general functions as those shown in FIG. 10. Holes in the corresponding substrate 40 are also shown. Those that pass the relevant fluid through the layer include holes 86 and 88 which are part of passage C, and hole 98 that forms part of the exit from passage A. Holes 145 provide exits from and re-entrances to the layer defined by wall structures 45 (and wall structures 35 shown in FIG. 10) and form a part of the broader, less tortuous sections 140 of passage A. The wall structures 45 shown in FIG. 10 define part of the narrower, more tortuous sections 130 of passage A as a series of ovoid cavities oriented horizontally in the figure. As part of the wall structures 45, each such cavity also includes, at each end, an obstruction in the form of a post 136. The wall structures 45 also define a portion of the broader, less tortuous sections 140 of the passage A leading to the holes 145.

As may be seen from FIGS. 8 and 9, the narrower, each of the more tortuous sections 130 of passage A as defined by the wall structures 35 and 45 provides a series of curves or bends in the passage, including bends downward (into the plane of the Figures) into the ovoids of FIG. 11 and upward (out of the plane of the Figures) into the ovoids of FIG. 10, as well as leftward and rightward along the ovoids of FIG. 11, and downward along the plane of the Figure along the ovoids of FIG. 10. These bends or curves in the passage A effectively lie in at least two planes (if not more), and accordingly are three-dimensionally tortuous and provide efficient generation of secondary flows within the fluid flowing in the passage. At the cost of a relatively small pressure drop compared to other micromixer designs, fast and thorough mixing is achieved.

Figure 12:
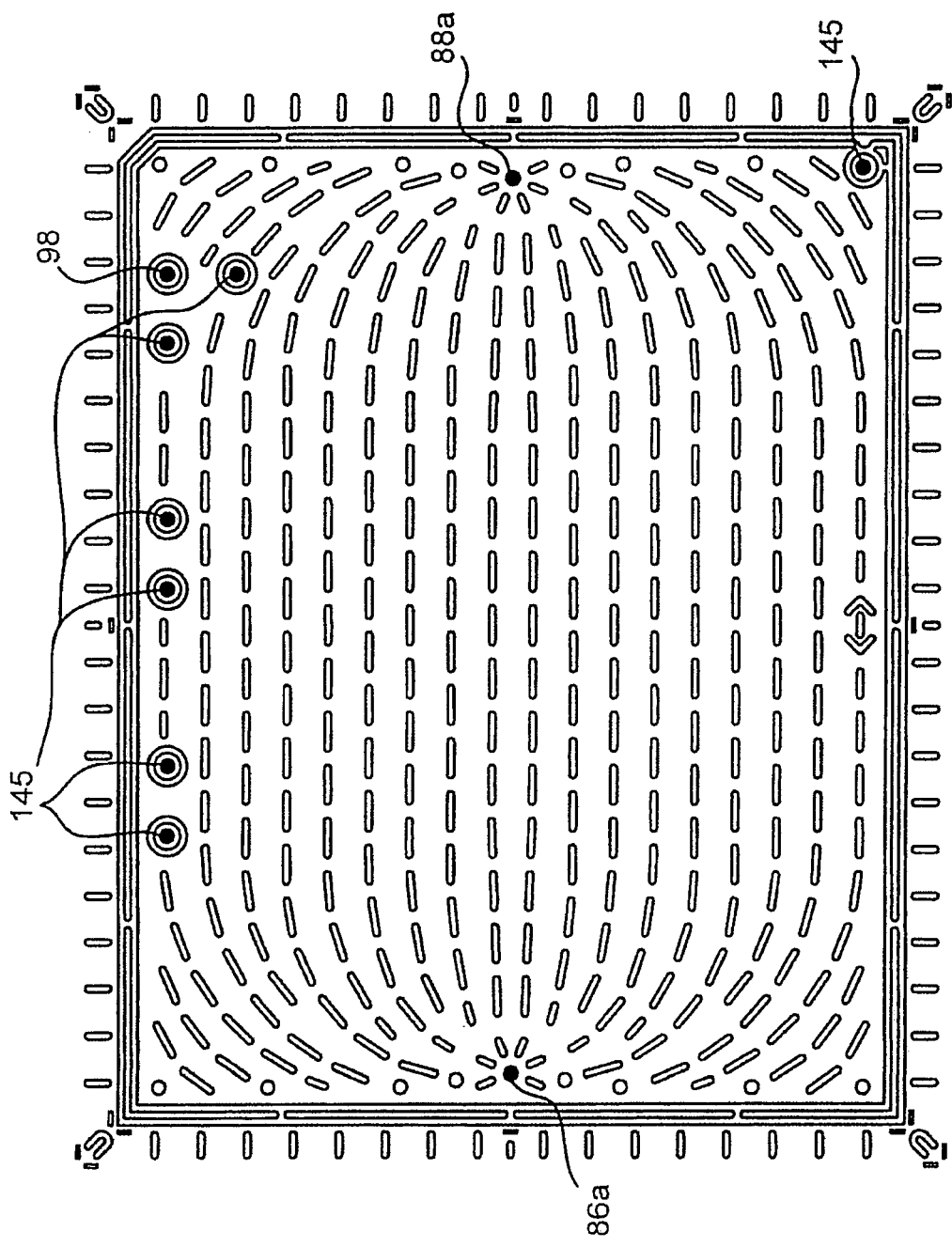

FIG. 12 is a plan view of the wall structures 55 such as would be originally formed on a substrate 50 as shown in FIG. 2. Locations of holes in the corresponding substrate 55 are also shown. Holes 145 simply pass the relevant fluid through the layer formed by the wall structures 55. Holes 86 and 88 through substrate 40 and shown in FIG. 11 provide access to the layer defined by the wall structures 55 in FIG. 12, which layer forms part of thermal control fluid passage C. Holes 86a and 88a through substrate 50 and shown in FIG. 12 are not required, but are optional holes constituting an alternative embodiment in which an addition layer of thermal control may be added below the layers shown in FIG. 2, or in which access to the thermal control fluid passage C may be provided from below the device shown in FIG. 2, instead of or in addition to from above.

Figure 13:
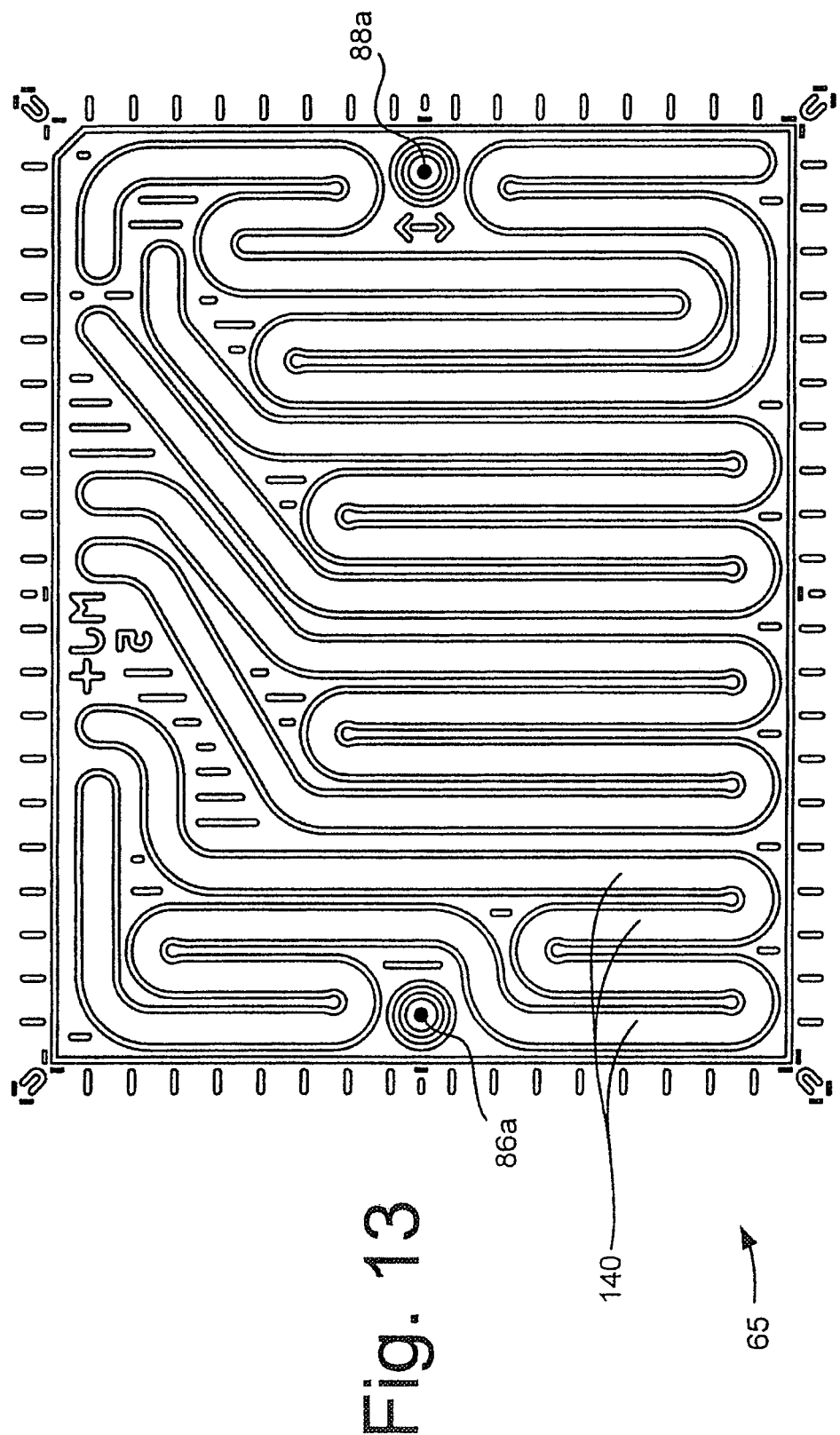

FIG. 13 is a plan view of the wall structures 65 such as would be originally formed on a substrate 60 as shown in FIG. 2. The wall structures 65 shown in FIG. 13 define additional portions of the broader, less tortuous sections 140 of passage A. As may be seen from the figure, four such portions are contained within the layer defined by the wall structures 65. Access to these portions is provided by the holes 145 through the substrates 40 and 50 the locations of which are shown in FIGS. 9 and 10, and the exit from the last such portion is provided by holes 98 through each of the substrates 20, 30, 40 and 50 as shown in FIGS. 2 and 7-10. Spreading the broader, less tortuous sections 140 of passage A between two layers within a device of the type shown in FIG. 2 allows for greater volume within the broader, less tortuous sections 140 while maintaining a compact overall device size. The greater volume allows for reasonably long residence times between successive entrances 92 and 94 to passage A, such that reactions can be completed and heat removed or added as needed before the next entrance 94 is reached.

Figure 14:
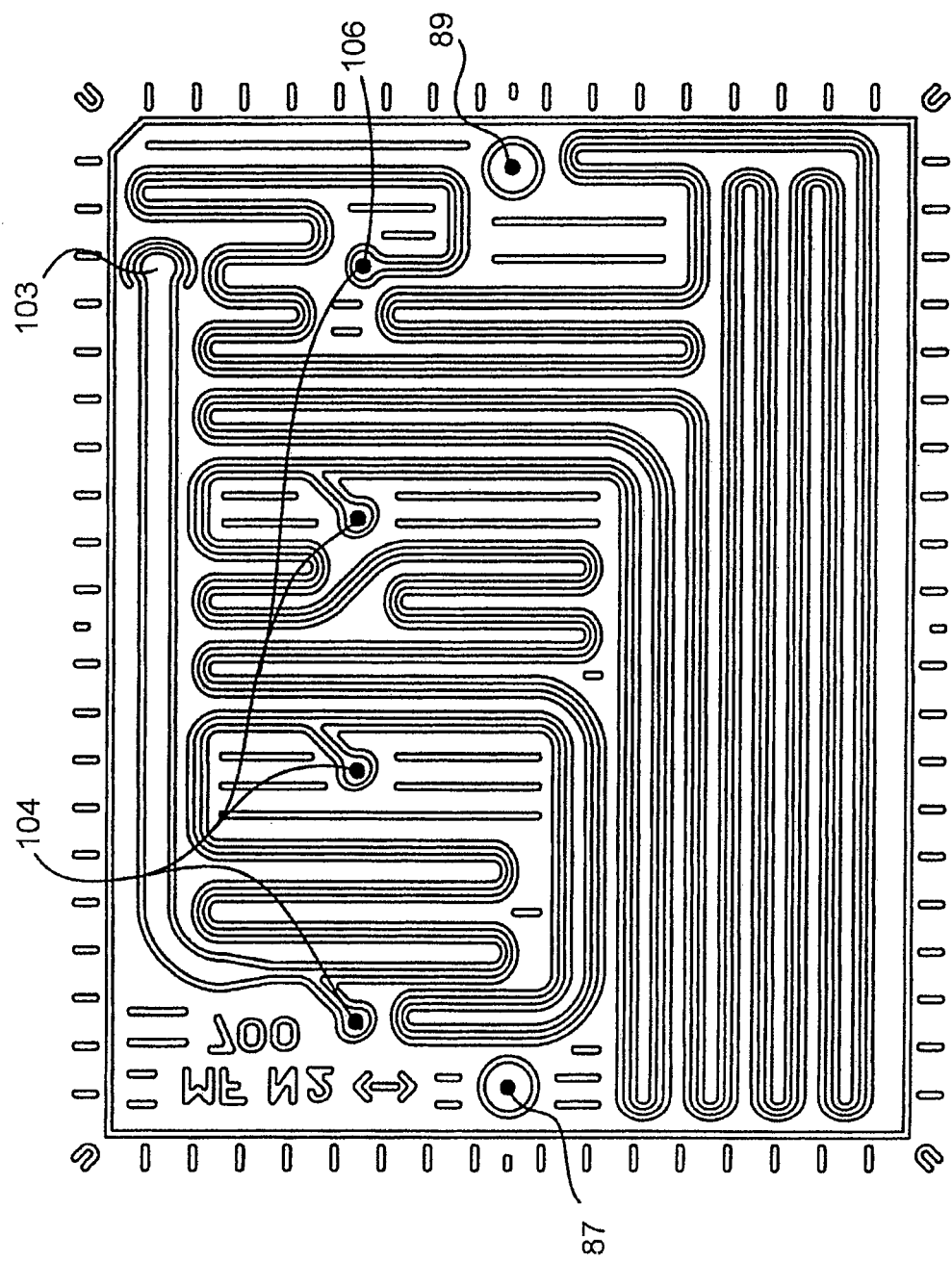
FIG. 14 is a plan view of a wall structure that may form part of an embodiment of the second unitary body 8 of FIG. 2.

FIG. 14 is a plan view of the wall structures 15a such as would be originally formed on a substrate 10 as shown in FIG. 2 or in FIG. 8. Wall structures 15a define an embodiment of the secondary passage B as shown in FIGS. 2 and 6, which constitutes the internal passage of a serial manifold for use in the context of the present invention. Locations of holes in the corresponding substrate 10 are shown as black circles. Holes through the substrate 15a provide exits 104 from passage B including the last exit 106 from passage B. The entrance 102 to passage B is provided by a hole through the substrate 11 as shown in FIGS. 2 and 6, at location 103 shown in FIG. 14. As may be seen from FIG. 14, the distance along the secondary fluidic passage B between successive ones of the multiple exits 104, in the direction away from the entrance location 103 of the secondary fluidic passage B and toward the last exit 106, increases from each successive exit 104 to the next. The successively longer passage portions feeding the successive exits 104 provides increased pressure drop (normalized at a given flow rate and viscosity) at each successive exit, allowing for fluid balancing such that contacting of reactants in principal passage A with reactants from secondary passage B occurs substantially only within principal passage A.

Figure 15:
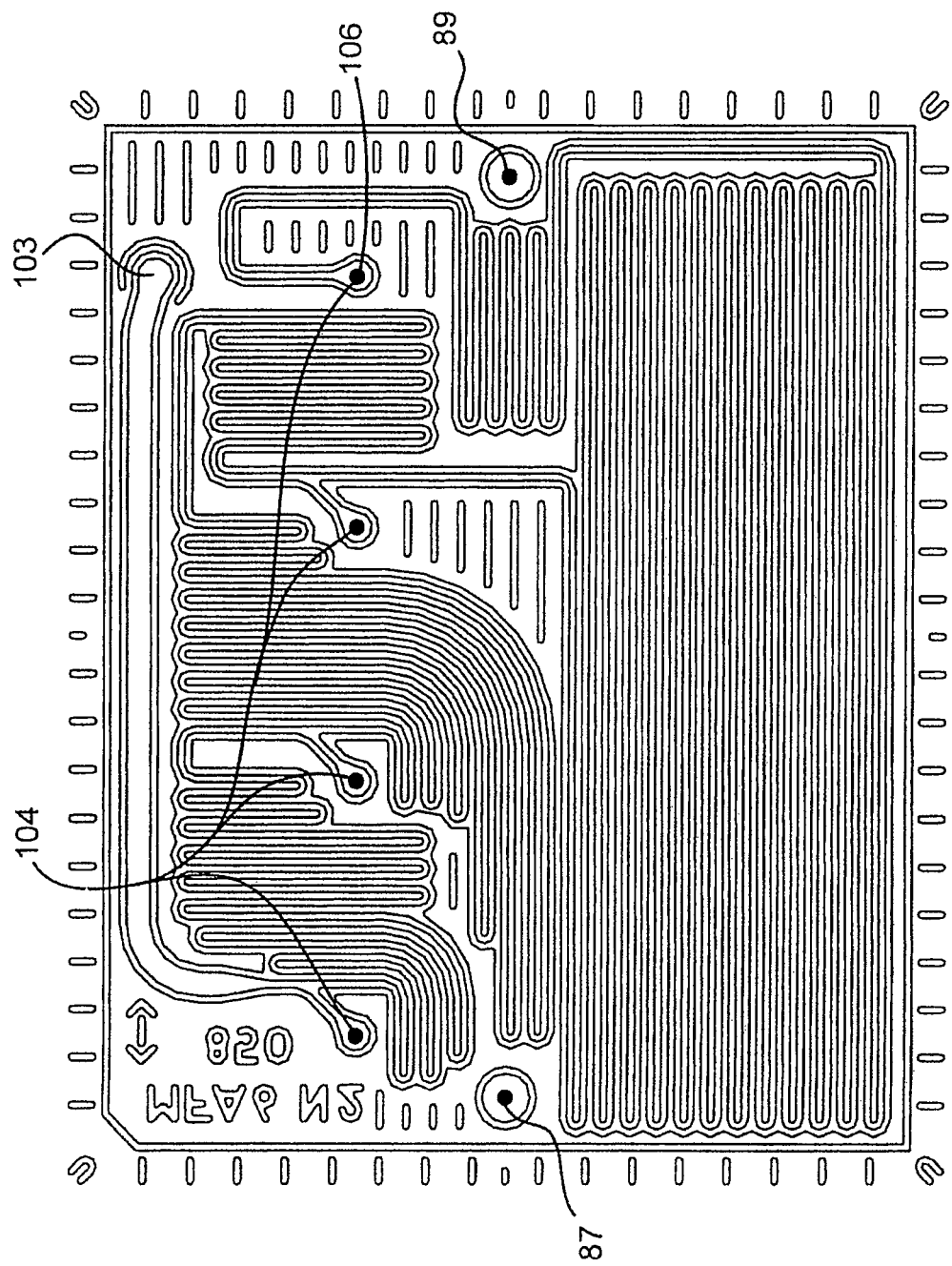
FIG. 15 is a plan view of an alternative wall structure that may form part of an embodiment of the second unitary body 8 of FIG. 2.

An alternative embodiment of the wall structures 15a is shown in plan view in FIG. 15. This embodiment is similar to that of FIG. 14, except that the entrance location 103 is different, and the passage lengths are greater, the widths are smaller, and the length increases from one exit 104 to the next are greater than in FIG. 14. A serial manifold according to FIG. 15 is able to provide larger pressure drop at successive manifold exits 104, than one according to FIG. 14 under the same conditions. Accordingly, the embodiment of FIG. 15 is optimized for lower viscosities and/or lower flow rates in the manifold than the embodiment of FIG. 14. If the serial manifold is not permanently fixed into the device as in FIG. 1, but is removeably coupled thereto as in FIG. 2 and FIG. 8, a few standardized manifolds may be used to cover a reasonably wide range of potential operating conditions, thus providing flexibility while still saving cost in number of pumps required to operate the reactor. As in FIG. 14, holes 87 and 89 are not required in the embodiment of FIG. 2 but are present to provide access to the layer defined by wall structures 17 in the embodiment of FIG. 8, which wall structures 17 define the thermal control passage E within the secondary unitary body 8. Wall structures 17 are desirably similar to wall structures 25 of FIG. 9 and 55 of FIG. 12.

In common across the various embodiments of the present invention described above, a reaction or mixing process performed in the devices of the present invention or according to the methods of the present invention is spread out serially along a principal fluidic passage, rather than being performed in massively parallel fashion in very small cross-sectional-area passages, as with internally numbered-up devices. Tighter thermal control is thus achieved without reduced passage size and the associated need for parallelism to overcome the tendency toward lower throughput. Serial rather than parallel flow splitting is used, and only in the one or more secondary fluidic passages, not in the principal fluidic passage. This allows the ideal molar ratio of the reactants to be approached always from the same side, without risk of a flow imbalance causing operation at an undesired ratio. Further, the smaller additions of reactant at each of the confluence points, relative to mixers with a single confluence point, ensures that local over-molar-ratio buildup of the added reactant is quite unlikely, providing improved molar ratio control.

Thermal control is also enhanced relative to microreaction devices employing parallel numbering up (or even employing a single unitary mixer) because the serial configuration of the present invention inevitably results in a lower adiabatic temperature rise (or lower decrease) than even the most finely divided parallel reaction design. This is because the energy produced (or consumed) by the reaction at a given one of the mixers in the reaction devices of the present type is spread throughout a greater mass of fluid than in a parallel numbered-up reactor or unitary reactor, since all of the passage A reactant stream is present at every reaction point. Assuming equal flows and thermal mass flows in A and B passages, for example, and equal division of flows out from the four exits 104 of passage B, the baseline adiabatic temperature change at the first mixer location (where the total mass flow is the least) in devices of the present invention is only ⅖ of the adiabatic temperature change of an equal-splitting parallel mixer architecture. If the total thermal mass flow is greater in passage A than in passage B, the advantage of the present architecture only increases. For example, where the ratio of thermal mass flow rates of passage A to passage B is 2:1, the adiabatic temperature change in a device of the present invention having four exits 104 is only ⅓ of a parallel or unitary mixer, at the first mixing point.

Examples of reactions that can benefit from the microreaction device(s) of the present invention, particularly from the molar ratio control, include bromination,

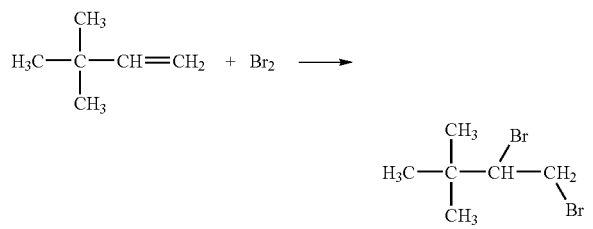

with bromination of 3,3 dimethyl but-1-ene shown here. This reaction may be performed by adding a solution of bromine in chloroform at −78° C. to a solution of butene in chloroform. Whenever the bromine is in excess of the desired molar ratio, further bromination of other functions than the double bound will occur, and, as one example, the following unwanted product may be formed:

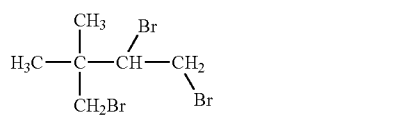

Certain reduction reactions, such as reduction of para nitro benzoic chloride with lithium aluminium tri tertbutoxy hydride, can also benefit. A solution of the lithium-tert-butoxyaluminium hydride in ether may be added to benzoyl chloride in diglyme at −70° C.:

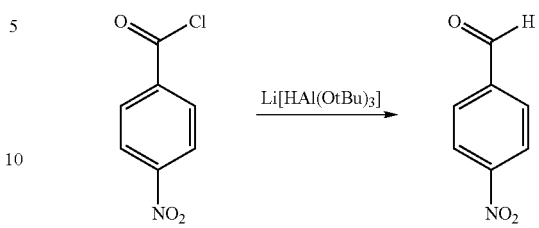

If there is any local excess hydride, an unwanted further reduction of the nitro group into amine, or of the aldehyde into alcohol, results.

The present invention can also be useful for esterification, such as reaction of catechol with benzoyl chloride:

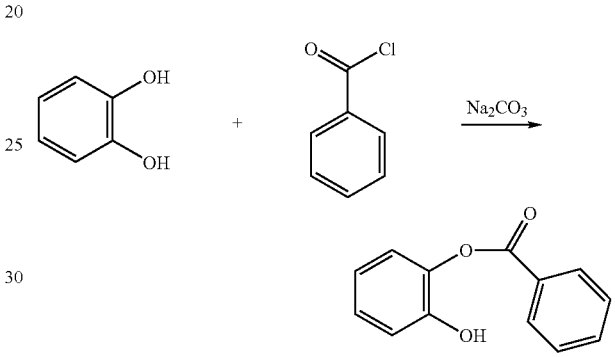

Benzoyl chloride may be added to a solution of catechol and sodium carbonate in water at room temperature. Strict control of local molar ratios is needed because high local concentrations of benzoyl chloride would lead to the formation of more diester.

The invention claimed is:

1. A unitary microreaction device comprising:
   at least one thermal control fluidic passage;
   a principal working fluidic passage with average cross-sectional area in the range of 0.25 to 100 mm$^2$, said principal fluidic passage having a primary entrance communicating at a first end thereof with the exterior of the device, and having multiple secondary entrances positioned serially at spaced locations along the length thereof, the spacing between secondary entrances having a length along the principal fluidic passage of at least two times the root of the average cross-sectional area of the principal fluidic passage;
   at least one secondary working fluidic passage having an average cross-sectional area in the range of 0.25 to 100 mm$^2$, said secondary fluidic passage having an entrance at a first end thereof and multiple exits positioned serially at spaced locations along the length thereof, said multiple exits including a final exit at the end thereof, each exit being in fluid communication with a corresponding one of the multiple secondary entrances of the principal fluidic passage, such correspondence being established in order from the exit and entrance nearest the respective first ends of the principal and secondary fluidic passages to the exit and entrance furthest therefrom,
   wherein said principal fluidic passage includes firstly a mixing section and secondly a dwell-time section, in order, between each one of said multiple secondary entrances in the direction away from the first end of said principal fluidic passage, wherein said mixing section comprises a section narrower and more tortuous than the dwell-time section and said dwell-time section comprises a section broader and less tortuous than the mixing section.

2. The device according to claim 1 wherein the distance along the secondary fluidic passage between successive ones of said multiple exits, in the direction away from the entrance of the secondary fluidic passage, increases from each successive one exit to the next.

3. The device according claim 1 wherein the cross-sectional area of the secondary fluidic passage generally decreases in the direction away from the entrance thereof.

4. The device according to claim 1 wherein each said narrower more tortuous section includes curves or bends in the passage, said curves or bends lying in more than one plane.

5. The device according to claim 1 wherein each said narrower more tortuous section shares at least one common wall with a thermal control fluidic passage selected from said at least one thermal control fluidic passage.

6. The device according to claim 1 wherein one or more of the narrower more tortuous sections of the principal fluidic passage vary from one or more others of the narrower more tortuous sections of the principal fluidic passage.

7. The device according to claim 1 wherein successive ones of the narrower more tortuous sections of the principal fluidic passage increase in cross-sectional area in the direction away from the entrance of the principal fluidic passage.

8. The device according to claim 1 wherein the narrower more tortuous sections of the principal fluidic passage include obstructions within the fluid path.

9. The device according to claim 8 wherein the obstructions decrease in size in from each successive one of the more tortuous sections to the next, in a direction away from the entrance of the principal fluidic passage.

10. The device according to claim 1 wherein the unitary body comprises glass, glass-ceramic, or ceramic.

11. The device according to claim 1 wherein the unitary body comprises at least one of glass, glass-ceramic, ceramic, metal, and plastic.

12. The device as recited in claim 1 wherein the principal fluidic passage has an average cross-sectional area in the range of 0.3 to 20 $mm^2$.

13. The device as recited in claim 1 wherein the principal fluidic passage has an average cross-sectional area in the range of 0.5 to 6 $mm^2$.

14. The device as recited in claim 1 wherein the secondary fluidic passage has an average cross-sectional area in the range of 0.3 to 20 $mm^2$.

15. The device as recited in claim 1 wherein the secondary fluidic passage has an average cross-sectional area in the range of 0.5 to 6 $mm^2$.

16. A microreaction system comprising at least two unitary pieces, including:
    a first piece comprising
    at least one thermal control fluidic passage;
    a principal working fluidic passage with average cross-sectional area in the range of 0.25 to 100 $mm^2$, said principal working fluidic passage having a primary entrance at a first end thereof communicating with the exterior of the first piece, and having at least one set of multiple secondary entrances positioned serially at spaced locations along the length thereof also communicating with the exterior of the first piece, the spacing between secondary entrances having a length along the principal fluidic passage of at least two times the root of the average cross-sectional area of the principal fluidic passage; and
    at least one second piece comprising:
    at least one secondary working fluidic passage having an average cross-sectional area in the range of 0.25 to 100 $mm^2$, said secondary fluidic passage having an entrance at a first end thereof communicating with the exterior of the second piece, and multiple exits positioned serially at spaced locations along the length thereof also communicating with the exterior of the second piece, said multiple exits including a final exit at the end thereof, with the relative positioning and spacing of the exits of the secondary fluidic passage in the second piece being matched to the relative spacing of at least some of the secondary entrances of the principal fluidic passage in the first piece, such that each respective exit aligns for direct fluid interconnection with a respective entrance, wherein said principal fluidic passage includes firstly a mixing section and secondly a dwell-time section, in order, between each one of said multiple secondary entrances in the direction away from the first end of said principal fluidic passage, wherein said mixing section comprises a section narrower and more tortuous than the dwell-time section and said dwell-time section comprises a section broader and less tortuous than the mixing section.

17. The system according to claim 16 wherein the distance along the secondary fluidic passage between successive ones of said multiple exits, in the direction away from the entrance of the secondary fluidic passage, increases from each successive one exit to the next.

18. The system according to claim 16 wherein the cross-sectional area of the secondary fluidic passage generally decreases in the direction away from the entrance thereof.

19. The system according to claim 16 wherein each said narrower more tortuous section includes curves or bends in the passage, said curves or bends lying in more than one plane.

20. The system according to claim 16 wherein each said narrower more tortuous section shares at least one common wall with a thermal control fluidic passage selected from said at least one thermal control fluidic passage.

21. The system according to claim 16 wherein one or more of the narrower more tortuous sections of the principal fluidic passage vary from one or more others of the narrower more tortuous sections of the principal fluidic passage.

22. The system according to claim 16 wherein successive ones of the narrower more tortuous sections of the principal fluidic passage increase in cross-sectional area in the direction away from the entrance of the principal fluidic passage.

23. The system according to claim 16 wherein the narrower more tortuous sections of the principal fluidic passage include obstructions within the fluid path.

24. The system according to claim 23 wherein the obstructions decrease in size in from each successive one of the more tortuous sections to the next, in a direction away from the entrance of the principal fluidic passage.

25. The system according to claim 16 wherein the first piece comprises glass, glass-ceramic, or ceramic.

26. The system according to claim 16 wherein the first piece comprises at least one of glass, glass-ceramic, ceramic, metal, and plastic.

27. The system as recited in claim 16 wherein the principal fluidic passage has an average cross-sectional area in the range of 0.3 to 20 $mm^2$.

28. The system as recited in claim 16 wherein the principal fluidic passage has an average cross-sectional area in the range of 0.5 to 6 mm².

29. The system as recited in claim 16 wherein the secondary fluidic passage has an average cross-sectional area in the range of 0.3 to 20 mm².

30. The system as recited in claim 16 wherein the secondary fluidic passage has an average cross-sectional area in the range of 0.5 to 6 mm².

31. The system according to claim 16 wherein the second piece further includes a second thermal control fluidic passage.

32. The system according to claim 16 wherein the relative positioning and spacing of the exits of the secondary fluidic passage in the second piece are matched to the relative spacing of each of the secondary entrances of the principal fluidic passage in the first piece, such that each respective exit aligns for direct fluid interconnection with a respective entrance.

33. The system according to claim 16 further comprising one or more additional second pieces, each of which may be selectively coupled to the first piece via a fluidic coupling, the secondary fluidic passages of at least some of such additional second pieces varying in one or more physical parameters from said second piece.

34. The system according to claim 33 wherein the at least some of such additional second pieces vary in total length of the secondary fluidic passage.

35. The system according to claim 33 wherein the at least some of such additional second pieces vary in average cross sectional area of the secondary fluidic passage.

36. The system according to claim 33 wherein the at least some of such additional second pieces vary in height of the secondary fluidic passage.

* * * * *